(12) United States Patent
Micko

(10) Patent No.: US 10,460,594 B2
(45) Date of Patent: *Oct. 29, 2019

(54) MOTION SENSOR

(71) Applicant: Greenwave Systems PTE. LTD., Singapore (SG)

(72) Inventor: Eric Scott Micko, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/884,454

(22) Filed: Jan. 31, 2018

(65) Prior Publication Data

US 2018/0151059 A1 May 31, 2018

Related U.S. Application Data

(63) Continuation of application No. 14/777,979, filed as application No. PCT/US2013/073799 on Dec. 9, 2013, now Pat. No. 10,055,973.

(51) Int. Cl.
*G01J 5/00* (2006.01)
*G08B 29/18* (2006.01)
(Continued)

(52) U.S. Cl.
CPC ............ *G08B 29/185* (2013.01); *G01B 11/00* (2013.01); *G01J 5/0022* (2013.01); *G01J 5/0025* (2013.01);
(Continued)

(58) Field of Classification Search
CPC ........ G01J 5/20; G01J 5/08; G01J 5/02; G01J 5/10; H04N 5/33
See application file for complete search history.

(56) References Cited

U.S. PATENT DOCUMENTS 4,614,938 A 9/1986 Weitman
4,618,854 A 10/1986 Miyake et al.
(Continued)

FOREIGN PATENT DOCUMENTS

CN 100565139 12/2009
CN 202284971 U 6/2012
(Continued)

OTHER PUBLICATIONS

US 9,905,121 B2, 02/2018, Micko (withdrawn)
(Continued)

*Primary Examiner* — David P Porta
*Assistant Examiner* — Mamadou Faye
(74) *Attorney, Agent, or Firm* — Young's Patent Services; Bruce A Young

(57) ABSTRACT

A motion sensor includes an infrared detector with a first set of detector elements and a second set of detector elements. The motion sensor also includes an optical system to direct electromagnetic energy from a first row of monitored volumes spaced at a pitch in a first direction onto the first set of detector elements and to direct electromagnetic energy from a second row of monitored volumes spaced at the pitch in the first direction onto the second set of detector elements. The second row of monitored volumes has an offset from the first set of monitored volumes in the first direction and the first row of monitored volumes and second row of monitored volumes are substantially non-overlapping.

20 Claims, 12 Drawing Sheets

(51) Int. Cl.
    *G08B 13/191*         (2006.01)
    *G01B 11/00*          (2006.01)
    *G01J 5/34*            (2006.01)
    *G08B 13/19*          (2006.01)
    *G08B 13/193*         (2006.01)
    *G01J 5/02*            (2006.01)
    *G01J 5/08*            (2006.01)

(52) U.S. Cl.
    CPC .............. *G01J 5/02* (2013.01); *G01J 5/0806* (2013.01); *G01J 5/0809* (2013.01); *G01J 5/0831* (2013.01); *G01J 5/34* (2013.01); *G08B 13/19* (2013.01); *G08B 13/191* (2013.01); *G08B 13/193* (2013.01); *G01J 2005/345* (2013.01)

(56) References Cited

U.S. PATENT DOCUMENTS

| | | | |
|---|---|---|---|
| 4,704,533 A | 11/1987 | Rose et al. | |
| 4,800,278 A | 1/1989 | Taniguti et al. | |
| 4,963,749 A * | 10/1990 | McMaster | G08B 13/191 |
| | | | 250/342 |
| 4,988,116 A | 1/1991 | Evertsen | |
| 5,045,702 A | 9/1991 | Mulleer | |
| 5,105,084 A | 4/1992 | Nagai et al. | |
| 5,283,551 A | 2/1994 | Guscott | |
| 5,313,060 A | 5/1994 | Gast et al. | |
| 5,461,231 A | 10/1995 | Sugimoto et al. | |
| 5,789,751 A | 8/1998 | Ma | |
| 5,923,250 A | 7/1999 | Pildner et al. | |
| 5,936,666 A | 8/1999 | Davis | |
| 6,049,080 A | 4/2000 | Ito | |
| 6,163,025 A | 12/2000 | Pantus | |
| 6,340,816 B1 | 1/2002 | Micko | |
| 6,559,448 B1 | 5/2003 | Mueller et al. | |
| 6,879,240 B2 | 4/2005 | Kruse | |
| 7,042,134 B2 | 5/2006 | Micko | |
| 7,075,431 B2 | 7/2006 | Buckley et al. | |
| 7,141,910 B2 | 11/2006 | Micko | |
| 7,183,912 B2 | 2/2007 | Micko | |
| 7,352,107 B2 | 4/2008 | Micko | |
| 7,399,969 B2 | 7/2008 | Micko | |
| 7,399,970 B2 | 7/2008 | Micko | |
| 7,498,576 B2 | 3/2009 | Micko | |
| 7,579,595 B2 | 8/2009 | Micko | |
| 7,622,845 B2 | 11/2009 | Micko | |
| 7,686,287 B2 | 3/2010 | Dixon et al. | |
| 7,710,337 B2 | 5/2010 | Blalock | |
| 7,755,052 B2 | 7/2010 | Micko | |
| 8,314,390 B2 | 11/2012 | Micko | |
| 8,354,643 B2 | 1/2013 | Micko | |
| 8,378,820 B2 | 2/2013 | Micko | |
| D742,770 S | 11/2015 | Windstrup et al. | |
| 9,188,487 B2 | 11/2015 | Zhevelev et al. | |
| 9,255,786 B2 | 2/2016 | Micko | |
| 9,301,412 B2 | 3/2016 | Micko et al. | |
| 9,304,044 B2 | 4/2016 | Micko | |
| 9,377,156 B2 | 6/2016 | Wong | |
| 9,569,953 B2 | 2/2017 | Micko | |
| 10,055,973 B2 * | 8/2018 | Micko | G08B 13/191 |
| 2004/0164647 A1 | 8/2004 | Micko | |
| 2004/0169145 A1 | 9/2004 | Micko | |
| 2005/0040947 A1 | 2/2005 | Buckley et al. | |
| 2005/0061979 A1 | 3/2005 | Narasako et al. | |
| 2005/0184869 A1 | 8/2005 | Micko | |
| 2005/0219046 A1 | 10/2005 | Noguchi | |
| 2005/0236572 A1 * | 10/2005 | Micko | G01V 8/10 |
| | | | 250/342 |
| 2006/0152109 A1 | 7/2006 | Micko | |
| 2007/0030148 A1 | 2/2007 | Gabriel et al. | |
| 2007/0099469 A1 | 5/2007 | Sorensen | |
| 2008/0170121 A1 | 7/2008 | Su et al. | |
| 2009/0065671 A1 | 3/2009 | Burgstaller | |
| 2009/0302220 A1 * | 12/2009 | Micko | G08B 13/191 |
| | | | 250/338.3 |
| 2010/0220192 A1 | 9/2010 | Cirker | |
| 2011/0210253 A1 | 9/2011 | Micko | |
| 2012/0105229 A1 | 5/2012 | Kates | |
| 2013/0119253 A1 | 5/2013 | Zhevelev et al. | |
| 2013/0169805 A1 | 7/2013 | Park | |
| 2014/0319349 A1 | 10/2014 | Horie et al. | |
| 2014/0350436 A1 | 11/2014 | Nathan et al. | |
| 2015/0208826 A1 | 7/2015 | Yang et al. | |
| 2015/0233702 A1 * | 8/2015 | Micko | G01B 11/00 |
| | | | 250/340 |
| 2016/0010972 A1 | 1/2016 | Micko | |

FOREIGN PATENT DOCUMENTS

| | | |
|---|---|---|
| CN | 102472030 B | 5/2014 |
| CN | 105793679 B | 1/2019 |
| EP | 2533026 A | 12/2012 |
| JP | S58213396 A | 12/1983 |
| JP | S6214028 B2 | 3/1987 |
| JP | H09297057 A | 11/1997 |
| JP | 2006018750 A | 1/2006 |
| JP | 2009014483 A | 1/2009 |
| JP | 2013210306 A | 10/2013 |
| JP | 6449321 B2 | 1/2019 |
| KR | 20100009894 U | 10/2010 |
| KR | 101909358 B1 | 10/2018 |
| WO | 2015088470 A1 | 6/2015 |
| WO | 2015132272 A1 | 9/2015 |

OTHER PUBLICATIONS

Canadian Intellectual Property Office, Office Action for counterpart Canadian Patent Application 2930127, dated Aug. 29, 2018.
Japan Patent Office, Decision of Registration for counterpart Japanese application 2016-557872, dated Nov. 6, 2018.
Japan Patent Office, Final Notice of Reasons for Refusal for counterpart Japanese application 2016-557872, dated May 22, 2018.
Scouten, Amy, Amendment/Remarks After Examiner's Report in counterpart Canadian Patent Application 2930127, dated Sep. 11, 2018.
AFDIP, Response-Amendment to Office Action in Counterpart Chinese Application 20130081471.3, dated Oct. 30, 2017.
Canadian Intellectual Property Office, Office Action for counterpart Canadian Patent Application 2930127, dated May 31, 2017.
Chinese Intellectual Property Office, Office Action in Counterpart Application 20130081471.3, dated Mar. 7, 2018.
Chinese Intellectual Property Office, Office Action in Counterpart Application 20130081471.3, dated Jun. 28, 2017.
European Patent Office, Provisional Opinion for counterpart EPO Application 13899275.5, dated Jun. 8, 2017.
European Patent Office, Supplemental Search Opinion for counterpart EPO Application 138992755, dated Oct. 6, 2017.
Excelitas Technologies, DigiPyro(r) PYQ 2898 Application Note, 2011, retrieved from http://www.excelitas.com/downloads/app_digipyropyq2898_0208.pdf on Aug. 14, 2013.
Intellectual Property Office of Singapore, Written Opinion regarding foreign counterpart application SG 12201604463U, dated Apr. 25, 2017.
Intellectual Property Office of Singapore, Examination Report for Counterpart Singaporean patent application 11201604463U, dated Nov. 9, 2017.
Young, Bruce, Response to Non-Final Office Action for U.S. Appl. No. 14/777,979, dated Aug. 10, 2017.
Japan Patent Office, Notice of Reasons for Refusal for counterpart Japanese application 2016-557872, dated Sep. 5, 2017.
Keane, Paul, Office Action Response for counterpart EPO application 13899275.5, dated Mar. 16, 2018.
Korean Intellectual Property Office, International Search Report for International Patent Application #PCT/US13/73799, dated Sep. 23, 2014.
Korean Intellectual Property Office, Notification of Reason for Refusal for related Korean Patent Application 10-2016-7018545, dated Mar. 29, 2018.

(56) References Cited

OTHER PUBLICATIONS

Korean Intellectual Property Office, Written Opinion of the International Searching Authority for International Patent Application #PCT/US13/73799, dated Sep. 23, 2014.
Murai Shinjyu GIP, Amendment-Response to Notice of Reasons for Refusal for counterpart Japanese application 2016-557872, dated Dec. 27, 2017.
Paton, Miram, Amendment/Remarks After Examiner's Report in counterpart Canadian Patent Application 2930127, dated Feb. 12, 2018.
Perkinelmer Optoelectronics, DigiPyro(r) Family PYD 1998, PYD 1988, PYD 1978 Application Note, 2008, retrieved from http://www.datasheetarchive.com/dl/Datasheets-UD4/DSAUD0062254.pdf on Sep. 10, 2013.
Duek, Regina, Response to Written Opinion of Intellectual Property Office of Singapore for related Singapore Patent Applicatino #11201604463U, dated Sep. 25, 2017.
USPTO, Non-Final Office Action for U.S. Appl. No. 14/777,979, dated May 19, 2017.
USPTO, Non-Final Office Action for U.S. Appl. No. 14/857,516, dated Apr. 8, 2016.
USPTO, Non-Final Office Action for U.S. Appl. No. 14/857,516, dated Sep. 2, 2016.
USPTO, Notice of Allowance for U.S. Appl. No. 14/292,998 dated Nov. 20, 2015.
USPTO, Notice of Allowance for U.S. Appl. No. 14/699,277, dated Aug. 18, 2015.
USPTO, Notice of Allowance for U.S. Appl. No. 14/777,979, dated Nov. 24, 2017.
USPTO, Notice of Allowance for U.S. Appl. No. 14/777,979, dated May 10, 2018.
USPTO, Notice of Allowance for U.S. Appl. No. 14/857,516, dated Oct. 13, 2016.
USPTO, Notice of Allowance for U.S. Appl. No. 14/857,516, dated Nov. 25, 2016.
Young, Bruce, Preliminary Amendment for U.S. Appl. No. 14/777,516, dated Sep. 18, 2015.
Young, Bruce, Response to Non-Final Office Action for U.S. Appl. No. 14/777,516, dated Jun. 28, 2016.
Young, Bruce, Response to Non-Final Office Action for U.S. Appl. No. 14/777,516, dated Sep. 9, 2016.
Chowdhury, et al., Video Synthesis of Arbitrary Views for Approximately Planar Scenes, Proceedings of International Conference on Acoustics, Speech and Signal Processing (ICASSP'03), pp. III_497-III_500, Apr. 6, 2003.
Kang, Ea Roo, Response to Office Action in related Korean Application 10-2016-7018545, dated Jun. 27, 2018.
Korean Intellectual Property Office, Notice of Allowance for related Korean Applicatoin 10-2016-7018545, dated Jul. 17, 2018.
Kwon, Seonggeun, Written Opinion (Response) to Korean Intellectual Property Office in related application #KR-10-2016-7018545, dated Jun. 27, 2018.
Murai Shinjyu GIP, Amendment-Response to Notice of Reasons for Refusal for counterpart Japanese application 2016-557872, dated Jul. 5, 2018.
Wu, et al., The Pyroelectric Sensor Based System; Human Tracking and Self-Calibration Scheme, Information Science and Technology (ICIST), 2012 International Conference on, IEEE, pp. 839-846, Mar. 23, 2012.

\* cited by examiner

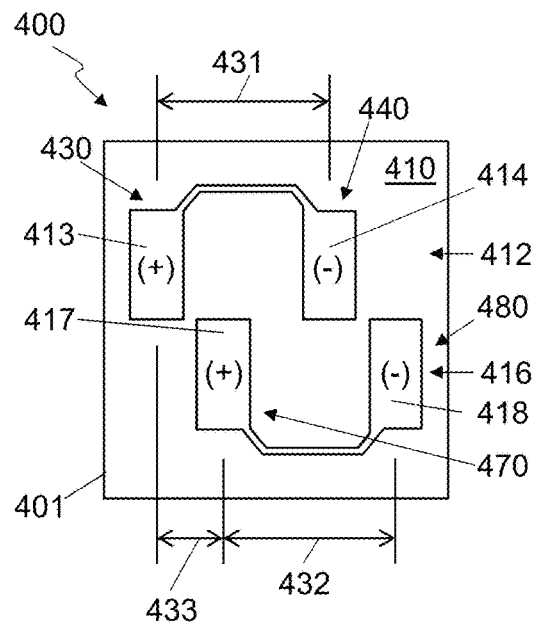
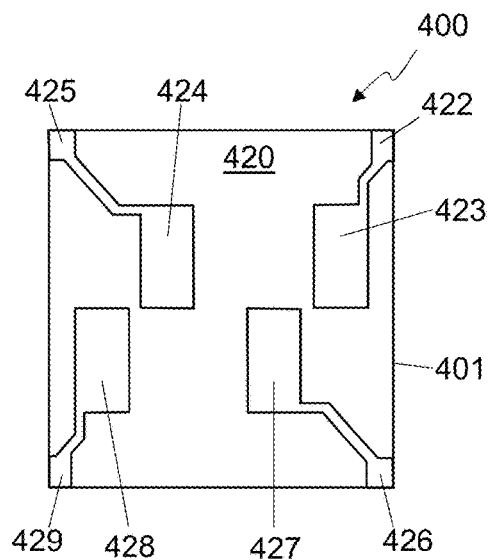
FIG. 4A
FIG. 4B
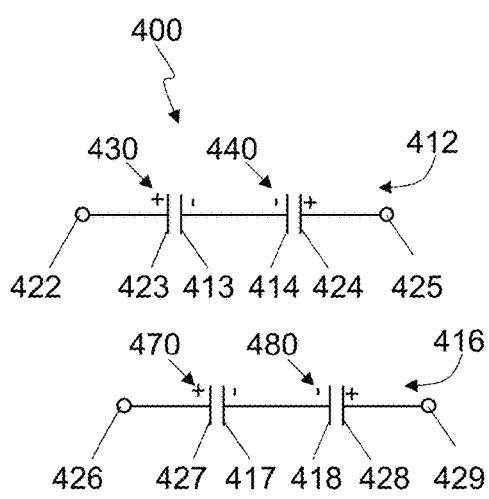
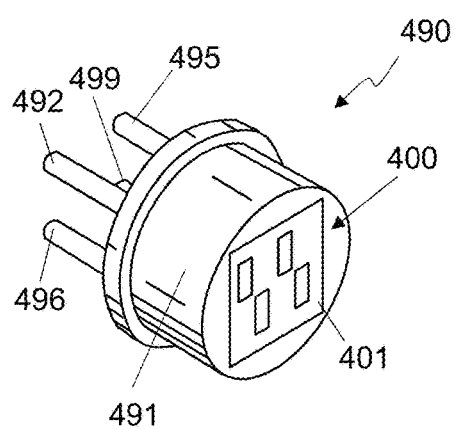
FIG. 4C
FIG. 4D

MOTION SENSOR

CROSS-REFERENCE TO RELATED APPLICATIONS

This application is a continuation of U.S. patent application Ser. No. 14/777,979, now U.S. Pat. No. 9,905,121, which is a § 371 national stage entry of international patent application PCT/US2013/073799 filed on Dec. 9, 2013, both of which are hereby incorporated by reference herein in their entirety for any and all purposes.

BACKGROUND

Technical Field

The present subject matter relates to motion detection. More specifically it relates to multi-output infrared radiation detectors and motion sensors using such an infrared detector.

Description of Related Art

Motion Sensors utilizing infrared (IR) radiation detectors are well known. Such sensors are often used in security systems or lighting systems to detect movement in a monitored space. An infrared detector detects changes in mid-infrared (IR) radiation having a wavelength of about 6-14 microns. These changes are due to temperature differences between a warm object, such as a warm blooded animal, and its background environment as the warm object moves through that environment. Upon detection of motion, motion sensors typically activate an audible alarm such as a siren, turn on a light, and/or transmit an indication that motion has been detected.

A typical infrared detector utilizes a pyroelectric or piezoelectric substrate with a detector element that consists of conductive areas on opposite sides of the substrate, acting as a capacitor. As the substrate changes temperature, charge is added or subtracted to the capacitor, changing the voltage across the capacitor. The amount of mid-IR radiation that hits the detector element determines the temperature of that area of the substrate, and therefore, the voltage across the capacitor that makes up the detector element. Some motion sensors utilize an infrared detector that includes multiple detector elements. To reduce the chance of false alarms, some infrared detectors include a pair of equally sized detector elements of opposing polarities. Non-focused out-of-band radiation, as well as ambient temperature changes or physical shock, is equally incident on both detector elements, thus causing the signals from the equal and opposite elements to roughly cancel one another.

Many motion sensors incorporate an optical array (comprised of optical elements, such as lenses, focusing mirrors, and so on) to be able to monitor a large space with a single infrared detector. The optical array directs the IR radiation from multiple monitored volumes onto the infrared detector, which sometimes includes filters to minimize the radiation outside of the desired mid-infrared range from reaching the infrared detector. Each of the monitored volumes is typically a pyramidal shaped volume extending into the space to be monitored with the apex of the pyramid at the motion sensor. Concentrations of radiation from each of the pyramids are projected by the optical arrays on to the infrared detector where they are superimposed, and different regions of the infrared detector are heated based on the amount of IR radiation received from the superimposed images. The detector elements on the infrared detector react to the localized heating by changing their voltage. The resultant change in voltage across the detector elements is monitored and used to detect motion in the space being monitored.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 4A and 4B are a front and rear view of another embodiment of an infrared detector;

FIG. 4C is a schematic of the embodiment of the infrared detector of FIG. 4A/B;

FIG. 4D is an isometric view of an embodiment of a packaged version of the infrared detector of FIG. 4A/B;

DETAILED DESCRIPTION

Figure 1A:
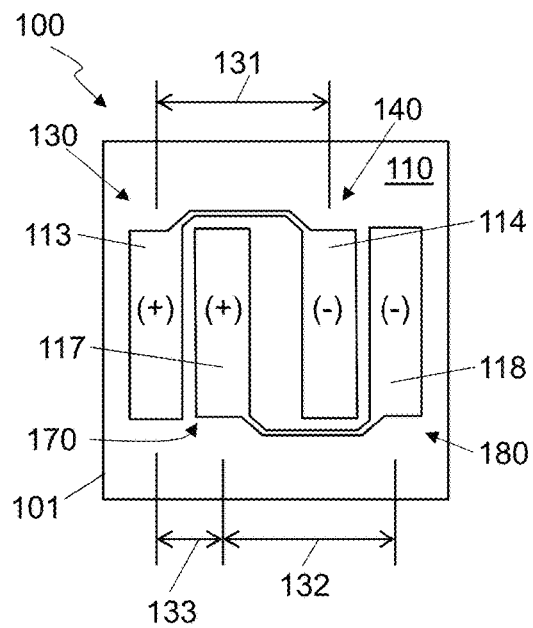
FIGS. 1A and 1B are a front and rear view of an embodiment of an infrared detector.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases that may be given meanings differently than their generally accepted definitions are presented in the following paragraphs for clarity.

A pyroelectric material is a material that temporarily generates a voltage as it is heated or cooled. If the temperature remains constant, the voltage may gradually disappear due to leakage current, depending on the pyroelectric material used. Examples of pyroelectric materials include the mineral tourmaline and the compounds gallium nitride, cesium nitrate, cobalt phthalocyanine, and lithium tantalite. A piezoelectric material is a material that generates a voltage in response to mechanical stress. Examples of piezoelectric materials include tourmaline, quartz, topaz, cane sugar, and sodium potassium tartrate tetrahydrate. Some materials exhibit both pyroelectric and piezoelectric properties and localized heating of a piezoelectric material can cause mechanical stress which then generates a voltage. Therefore, while the detailed physical properties of pyroelectric materials and piezoelectric materials are different, the two terms are used as synonyms herein and in the claims. Thus, a reference to a pyroelectric material includes both pyroelectric materials and piezoelectric materials.

An infrared radiation detector, or simply infrared detector or IR detector, is a component having one or more outputs to provide information related to warm objects in a field of view of the infrared detector. An infrared detector has one or more detector elements on a pyroelectric substrate. The detector elements receive electromagnetic radiation, such as mid-infrared radiation, and receive a pyroelectric charge from the substrate which is then exhibited at the outputs of the infrared detector.

A motion sensor is a system for detecting motion in a monitored space. A motion sensor includes one or more infrared detectors, an optical system to direct electromagnetic radiation from the monitored space onto the infrared detector(s), and circuitry to receive the information related to motion from the infrared detector(s) and take action based on that information. Any type of action can be taken, but various embodiments take actions such as, but not limited to, sounding an audible alarm, turning a light on or off, or sending a message indicating that motion was detected.

In at least some embodiments, a motion sensor has at least two tiers of monitored volumes that are offset from each other. Electromagnetic radiation, such as infrared light, is directed from the monitored volumes onto at least two sets of detector elements having separate outputs on a pyroelectric substrate of an infrared detector. As a warm object, such as a human or an animal, moves through the monitored volumes, the warmth from the object causes the voltage on the outputs of the infrared detector to change. The resultant waveforms are compared and if the two waveforms have a phase relationship corresponding to a critical phase angle that is based on the pitch of the monitored volumes and the offset between the tiers of monitored volumes, an animal-immune motion, or major motion, indication is generated. An animal-immune motion, or major motion, indication is generated in response to a large warm body, such as a human, moving through the monitored volumes. Movement by a small warm body, such as a dog or a cat does not generate an animal-immune motion, or major motion, indication.

The term "corresponding to a critical phase angle," as used in this disclosure including the claims, means that the phase difference, or phase relationship, is close to the critical phase angle, or is within a range that contains the critical phase angle. In some embodiments, the phase relationship may be deemed to correspond to the critical phase angle if it falls within about ±10° of the critical phase angle. In at least one embodiment, the phase relationship may be deemed to correspond to the critical phase angle if it falls within about ±30° of the critical phase angle. In other embodiments, the range that corresponds to the critical phase angle may be of any size and/or may be asymmetric around the critical phase angle.

Embodiments of a motion sensor built in accordance with the present disclosure direct infrared light from a first set of monitored volumes from within the monitored space onto a first set of detector elements and from a second set of monitored volumes from within the monitored space onto a second set of detector elements. The first set of monitored volumes and the second set of monitored volumes have different azimuth angles from the motion sensor, or are offset from each other, and are interleaved, so as an object moves through the monitored volumes, an output from the first set of detector elements and an output from the second set of detector elements are similar but have a phase difference. By detecting a phase difference between the outputs that corresponds to the azimuth difference (a critical phase angle), false positives are reduced as compared to traditional motion sensors.

In some embodiments, the optical system creates the different azimuth angles for the two sets of monitored volumes, but in other embodiments, the arrangement of the detector elements on the infrared detector creates the different azimuth angles. In some embodiments, the phase difference of the two outputs is an angle other than a multiple of 90 degrees (0°, 90°, 180°, 270° and so on).

In some embodiments, the first set of monitored volumes and the second set of monitored volumes are at different elevations from the motion sensor to allow the two sets of monitored volumes to project to different distances from the motion sensor. If the two sets of monitored volumes have different elevations, objects that are large enough to intersect both sets of monitored volumes can be differentiated from objects that are small enough to intersect only one set of monitored volumes. This allows some embodiments to differentiate between major motion (e.g. that of a walking human, but not that of the ordinary motion of a small animal, such as a pet) and minor motion (e.g. due to monitored volumes' occupancy by a seated and slightly-moving human, or due to the ordinary motion of a small animal, such as a pet).

Reference now is made in detail to the examples illustrated in the accompanying drawings and discussed below.

Figure 1B:
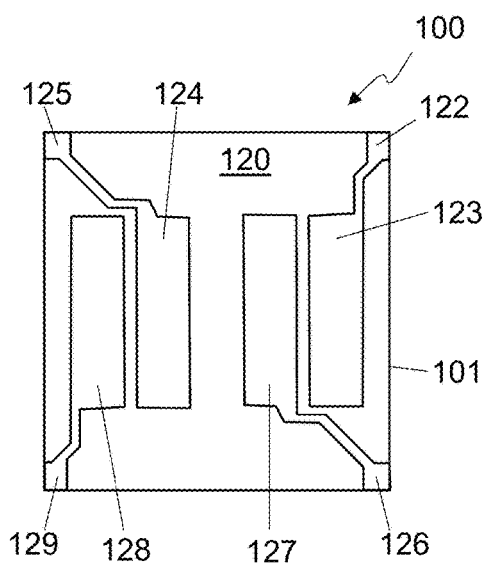

FIGS. 1A and 1B are a front and rear view, respectively, of an embodiment of an infrared detector 100. The infrared detector includes a substrate 101 made with a pyroelectric material. In some embodiments, the substrate 101 is entirely or nearly entirely made from a pyroelectric material, but in other embodiments, the substrate 101 is made from an inert insulator with one or more coatings or layers of a pyroelectric material. Other embodiments use different constructions of the substrate 101, but still include pyroelectric material in the substrate 101.

The infrared detector 100 includes a first set of detector elements that includes one detector element 130 that includes pad 113 on the front side 110 of the substrate 101 and pad 123 on the back side 120 of the substrate 101, and another detector element 140 that includes pad 114 on the front side 110 of the substrate 101 and pad 124 on the back side 120 of the substrate 101. Note that pad 123 is nearly directly opposite of pad 113 on the substrate 101, and pad 124 is nearly directly opposite of pad 114 on the substrate 101. The two detector elements 130, 140 of the first set of detector elements are positioned on the substrate 101 spaced a pitch distance 131 apart. In some embodiments, the two detector elements 130, 140 are approximately the same size, but in other embodiments, they may have different sizes. The detector element 130 is coupled between an output pad 122 and the detector element 140, which is coupled to another output pad 125. Thus, the first set of detector elements includes at least two serially coupled detector elements 130, 140. In the embodiment shown, the detector element 130 is configured to provide a positive voltage between the output pad 125 and the output pad 122 in response to a positive change in temperature, and the detector element 140 is configured to provide a negative voltage between the output pad 125 and the output pad 122 in response to a positive change in temperature.

The infrared detector 100 also includes a second set of detector elements that includes one detector element 170 that includes pad 117 on the front side 110 of the substrate 101 and pad 127 on the back side 120 of the substrate 101, and another detector element 180 that includes pad 118 on the front side 110 of the substrate 101 and pad 128 on the back side 120 of the substrate 101. Note that pad 127 is nearly directly opposite of pad 117 on the substrate 101, and pad 128 is nearly directly opposite of pad 118 on the substrate 101. The two detector elements 170, 180 of the second set of detector elements are positioned on the substrate 101 spaced a pitch distance 132 apart. In embodiments, the pitch distance 131 of the first set of detector elements is approximately the same as the pitch distance 132 of the second set of detector elements. In embodiments, detector element 170 is approximately the same size as detector element 130, and detector element 180 is approximately the same size as detector element 140. All four detector elements 130, 140, 170, 180 are approximately the same size in some embodiments. The detector element 170 is coupled between an output pad 126 and the detector element 180, which is coupled to another output pad 129. Thus, the second set of detector elements includes at least two serially coupled detector elements 170, 180. In the embodiment shown, the detector element 170 is configured to provide a positive voltage between the output pad 129 and the output pad 126 in response to an increase in temperature, and the detector element 180 is configured to provide a negative voltage between the output pad 129 and the output pad 126 in response to the increase in temperature.

In the embodiment of FIG. 1A/B, the first set of detector elements 130, 140 and the second set of detector elements 170, 180 are overlapping and approximately aligned in one direction, (e.g. vertical in FIG. 1A/B), but are interleaved and positioned with an offset 133 in the orthogonal direction (e.g. horizontal in FIG. 1A/B). The offset 133 can be characterized as a percentage of the pitch distance 131, 132. If the offset 133 is half (50%) of the pitch distance 131, 132, the offset 133 can be referred to as a quadrature offset, because the pitch distance 131, 132 represents one half of a full cycle of a waveform where the first detector element of a set of detector elements (e.g. detector element 130) represents the beginning of the cycle, and the second detector element of the set of detector elements (e.g. detector element 140) represents the beginning of the second half of the cycle due to its opposite polarity. If the offset 133 is not equal to one half of the pitch distance 131, 132, the offset 133 can be referred to as a non-quadrature offset. A non-quadrature offset is a physical offset with respect to a common axis that is not a multiple of one half of the pitch distance and is non-zero. In the embodiment shown in FIG. 1A/B, the second set of detector elements 170, 180 are positioned with a non-quadrature offset 133 from the first set of detector elements 130, 140. In some embodiments, the non-quadrature offset 133 is between about 5% of the pitch distance 131, 132 and about 45% of the pitch distance 131, 132 or between about 55% of the pitch distance 131, 132 and about 95% of the pitch distance 131, 132. In at least one embodiment, the non-quadrature offset 133 is about one third or about two thirds of the pitch distance 131, 132.

Figure 1C:
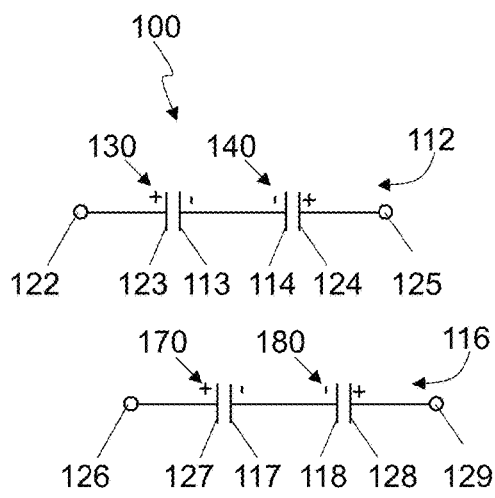
FIG. 1C is a schematic of the embodiment of the infrared detector of FIG. 1A/B.

FIG. 1C is a schematic of the embodiment of the infrared detector 100 of FIG. 1A/B. The first set of serially coupled detector elements 112 are shown as polarized capacitors 130, 140 to indicate the polarity of voltage generated by the detector element in response to an increase in temperature. The electrodes of the capacitors 130, 140 are marked with the reference number of its corresponding pad of the detector element. So the detector element, or capacitor, 130 includes pad 123 and pad 113, and detector element, or capacitor, 140 includes pad 114, and pad 124. The first set of detector elements 112 is coupled to the output pad 122 and to the output pad 125.

The second set of serially coupled detector elements 116 are shown as polarized capacitors 170, 180 to indicate the polarity of voltage generated by the detector element in response to an increase in temperature. The electrodes of the capacitors 170, 180 are marked with the reference number of its corresponding pad of the detector element. So the detector element, or capacitor, 170 includes pad 127 and pad 117, and detector element, or capacitor, 180 includes pad 118, and pad 128. The second set of detector elements 116 is coupled to the output pad 126 and to the output pad 129. In at least some embodiments, the output pad 125 and output pad 129 are coupled to ground, the output pad 122 is a first output of the infrared detector 100, and the output pad 126 is the second output of the infrared detector 100. So in at least some embodiments, a first output 122 is coupled to the first set of detector elements 112, and a second output 126 is coupled to the second set of detector elements 116.

Figure 1D:
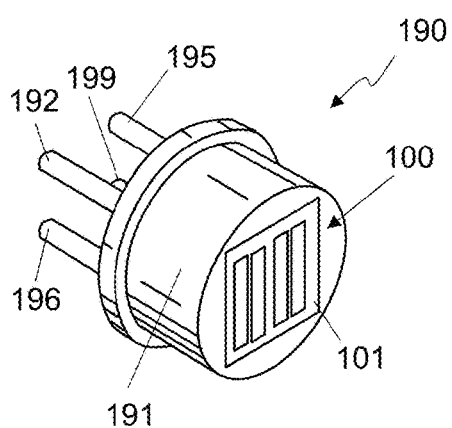
FIG. 1D is an isometric view of an embodiment of a packaged version of the infrared detector of FIG. 1A/B.

FIG. 1D is an isometric view of an embodiment of a packaged version 190 of the infrared detector 100 of FIG. 1A/B. The packaged version 190 includes a package 191, such as a standard TO-5 metal housing or some other type of packaging, with the substrate 101 of the infrared detector 100 mounted inside of the package 191 behind a mid-IR-transmissive window (or window/filter) in a way to allow external mid-IR electromagnetic energy to affect the substrate 101 of the infrared detector 100 while at the same time shielding the substrate 101 from non-mid-IR influences. The packaged version 190 includes at least one terminal 192-199 accessible from outside of the package. The packaged version 190 includes circuitry, mounted in the package 191 and coupled between the detector elements of the infrared detector 100 and the at least one output terminal 192-199. In some embodiments, the circuitry simply provides electrical connectivity between the substrate 101 and the at least one terminal 192-199. In at least one embodiment, the output terminal 192 is coupled to the output pad 122, the output terminal 195 is coupled to the output pad 125, the output terminal 196 is coupled to the output pad 126, and the output terminal 199 is coupled to the output pad 129. In other embodiments, the circuitry can detect a first pyroelectric effect on the first set of detector elements 112 and a second pyroelectric effect on the second set of detector elements 116, and provide information about the first pyroelectric effect and the second pyroelectric effect at the at least one output terminal 192-199. In at least one embodiment, the output terminal 195 is a power input for the circuitry which includes transistor buffers, the output terminal 199 is a ground terminal and is coupled to the output pad 125 and the output pad 129, the output pad 122 is coupled through a transistor buffer to output terminal 192, and the output pad 126 is coupled through a transistor buffer to output terminal 196. In yet another embodiment, the output terminal 195 is a power input for the circuitry which includes two analog to digital converters (ADC), the output terminal 199 is a ground terminal and is coupled to the output pad 125 and the output pad 129, the output pad 122 is coupled to a first ADC, whose output is coupled to the output terminal 192, and the output pad 126 is coupled to a second ADC, whose output is coupled to the output terminal 196. In another embodiment, the output terminal 195 is a power input for the circuitry which includes an analog to digital converter (ADC), the output terminal 199 is a ground terminal and is coupled to the output pad 125 and the output pad 129, and the output pad 122 and the output pad 126 are both coupled to the ADC, whose output is coupled to the output terminal 192, and output terminal 196 is omitted from the embodiment or is not coupled to the circuitry or the infrared detector 100.

Figure 2A:
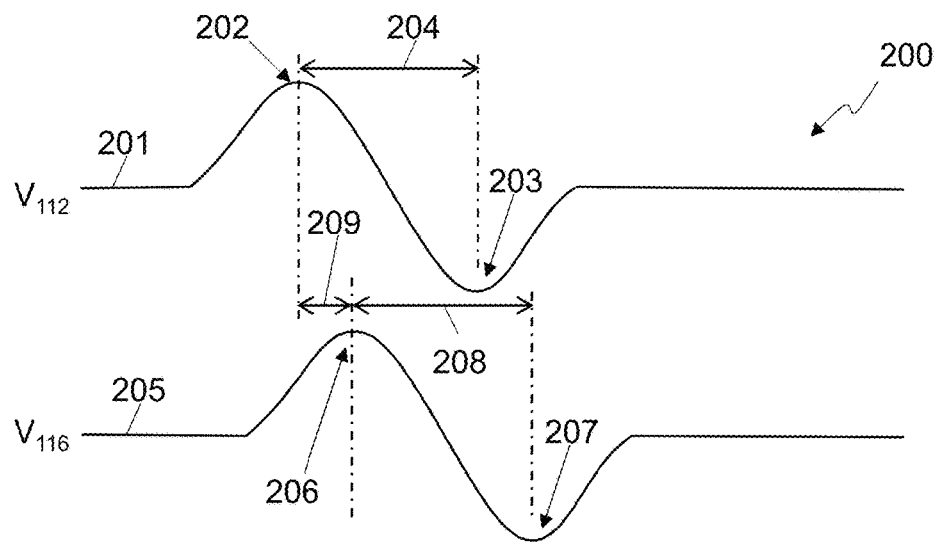
FIGS. 2A and 2B are example waveforms from the embodiment of the infrared detector of FIG. 1A/B.
Figure 2B:
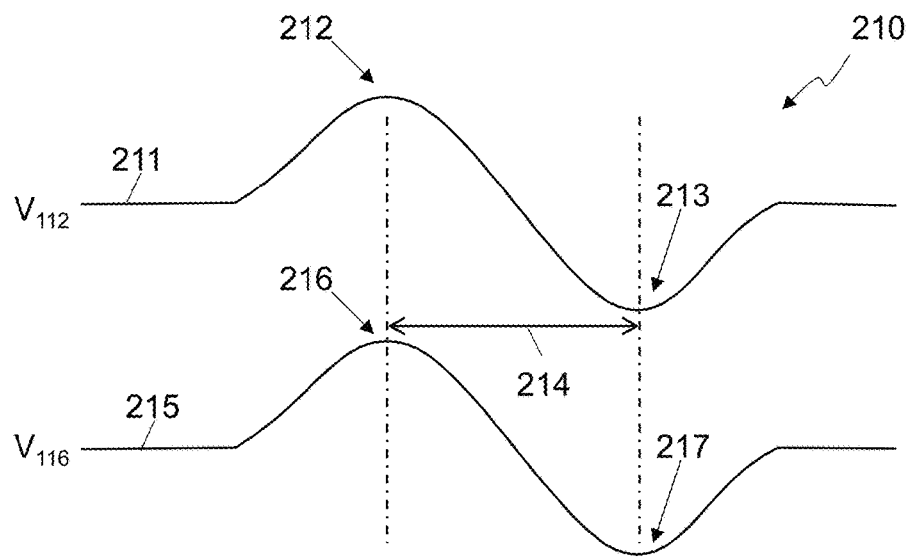

FIGS. 2A and 2B are example waveforms from the embodiment of the infrared detector 100 of FIG. 1A/B. FIG. 2A shows waveforms 200 representing the response of the infrared detector 100 to infrared light from a warm object moving across the monitored space directed onto the infrared detector 100. It should be noted that the waveforms 210 may not represent any particular moving object or actual monitored space environment, but are provided here to help explain the operation of the infrared detector 100. The waveforms 200 include waveform 201 representing the voltage across the first set of detector elements 112, or the voltage at the output pad 122, assuming that the output pad 125 is grounded. The waveforms 200 also include waveform 205 representing the voltage across the second set of detector elements 116, or the voltage at the output pad 126, assuming that the output pad 129 is grounded.

In response to infrared light from the warm object moving through a monitored volume directed onto the first detector element 130, the detector element 130 generates a positive voltage 202 for waveform 201. As the warm object moves from the monitored volume from which infrared radiation is directed onto the detector element 130, to the monitored volume from which infrared radiation is directed onto the detector element 170, the voltage on the waveform 201 begins to drop, and the detector element 170 generates a positive voltage 206 for waveform 205. As the warm object moves from the monitored volume from which infrared radiation is directed onto the detector element 170, to the monitored volume from which infrared radiation is directed onto the detector element 140, the voltage on the waveform 205 begins to drop, and the detector element 140 generates a negative voltage 203 for waveform 201. Then, as the warm object moves from the monitored volume from which infrared radiation is directed onto the detector element 140, to the monitored volume from which infrared radiation is directed onto the detector element 180, the voltage on the waveform 201 begins to rise, and the detector element 180 generates a negative voltage 207 for waveform 205. The time 204 from the maximum voltage 202 to the minimum voltage 203 of the waveform 201 can be thought of as half of one full cycle, or period, of the waveform 201. The time 208 from the maximum voltage 206 to the minimum voltage 207 of the waveform 205 can be thought of as half of one full cycle, or period, of the waveform 205.

The motion of the warm object generates a first waveform 201 across the first set of detector elements 112, and a second waveform 205 across the second set of detector elements 116. Because the first set of detector elements 112 and the second set of detector elements 116 have approximately the same size and pitch, the first waveform 201 and the second waveform 202 are approximately equivalent and have about the same half period 204, 208. But because the first set of detector elements 112 and the second set of detector elements 116 have an offset 133, there is phase shift between the two waveforms 201, 205 shown by the phase delay 209. The phase shift, or phase angle difference, can be calculated by comparing the phase delay 209 to the half period 204, 208. The phase shift can be calculated as a percentage of the half period 204, 208, which corresponds to the offset between the first set of detector elements 112 and the second set of detector elements 116, although other embodiments may calculate the phase shift as an angle by multiplying the calculated percentage by 180°. If the calculated phase shift corresponds to the offset 133 between the two sets of detector elements 112, 116, the waveforms 201, 205 were very likely to have been caused by actual movement of a warm object through the monitored space. If a phase shift is found between the two waveforms 201, 205 that does not correspond to the offset between the two sets of detector elements 112, 116, the waveforms 201, 205 were likely not caused by actual movement, but by some other cause. This behavior can be used to reduce the generation of false detections of movement, or false alarms.

The term "corresponding to the offset," as used in this disclosure including the claims, means that the phase difference, or phase relationship, of the detected waveforms, as a percentage of a half cycle (180°), is close to the offset calculated as a percentage of the pitch of the detector elements, or is within a range that contains the offset. In some embodiments, the phase relationship may be deemed to correspond to the critical phase angle if it falls within a range about the offset of about ±6% of the pitch (e.g. a range of about 27% to about 39% if the offset is 33%). In at least one embodiment, the phase relationship may be deemed to correspond to the critical phase angle if it falls within a range about the offset of about ±20% of the pitch (e.g. a range of about 13% to about 53% if the offset is 33%). In other embodiments, the range that corresponds to the offset may be of any size, and/or may be asymmetric around the offset.

FIG. 2B shows waveforms 210 representing the response of the infrared detector 100 to a sudden change in temperature of the infrared detector 100 or some sort of mechanical shock received by the infrared detector 100 that might cause a false detection of movement in prior systems. It should be noted that the waveforms 210 may not represent an actual event, but are provided here to help explain the operation of the infrared detector 100. The waveforms 210 include waveform 211 representing the voltage across the first set of detector elements 112, or the voltage at the output pad 122 assuming that the output pad 125 is grounded. The waveforms 210 also include waveform 215 representing the voltage across the first set of detector elements 116, or the voltage at the output pad 126 assuming that the output pad 129 is grounded. Note that the first waveform 211 and the second waveform rise together to a maximum 212 and a maximum 216, respectively, and then fall together to a minimum 213 and a minimum 217, respectively. Both waveforms 211, 215 have a half period 214 that is equal but there is no phase shift between the two waveforms 211, 215. As such, it can be determined that the waveforms 210 are not indicative of movement, and no indication of movement would be generated by embodiments of a motion sensor in response to these waveforms.

Figure 3:
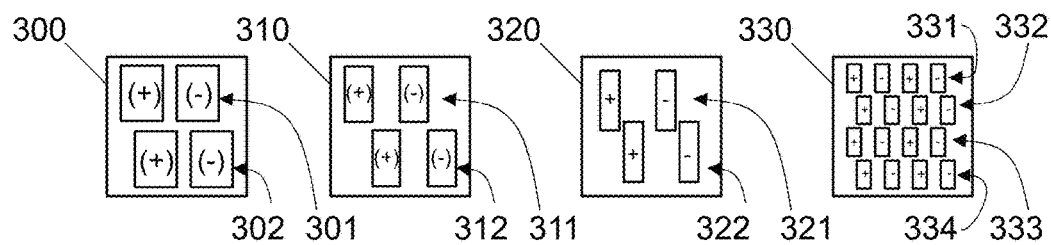
FIG. 3 shows alternate embodiments of an infrared detector.

FIG. 3 shows alternate embodiments of an infrared (IR) detector. The embodiments shown all include a pyroelectric substrate with a plurality of detector elements. A first alternate embodiment of an infrared detector 300 includes a first set of two serially coupled detector elements 301 and a second set of two serially coupled detector elements 302. The first set of serially coupled detector elements 301 comprises a first row, and the second set of detector elements 302 comprises a second row that is non-overlapping with the first row. The first set of detector elements 301 has a non-quadrature offset from the second set of detector elements 302 in the infrared detector 300, but the detector elements are sized so that the individual detector elements of the first set of detector elements 301 overlap with the individual detector elements of the second set of detector elements 302. Thus, a vertical line through the infrared detector 300 may intersect a detector element of the first row 301 and a detector element of the second row 302.

A second alternate embodiment of an infrared detector 310 includes a first set of serially coupled detector elements 311 and a second set of serially coupled detector elements 312. The first set of serially coupled detector elements 311 comprises a first row, and the second set of detector elements 312 comprises a second row that is non-overlapping with the first row. The first set of detector elements 311 has a quadrature offset from the second set of detector elements 312 in the infrared detector 310, and the detector elements are sized so that the individual detector elements of the first set of detector elements 311 do not overlap with the individual detector elements of the second set of detector elements 312, but leave little uncovered horizontal space between the two sets of detector elements 311, 312, so that no vertical line through the infrared detector 310 can intersect more than one detector element, and very few possible vertical lines through the infrared detector 310 will not intersect any detector elements.

A third alternate embodiment of an infrared detector 320 includes a first set of serially coupled detector elements 321 and a second set of serially coupled detector elements 322. The first set of serially coupled detector elements 321 comprises a first row, and the second set of detector elements 322 comprises a second row that partially overlaps with the first row. The first set of detector elements 321 has a non-quadrature offset from the second set of detector elements 322 in the infrared detector 320, and the detector elements are sized so that the individual detector elements of the first set of detector elements 321 do not horizontally overlap with the individual detector elements of the second set of detector elements 322, and leave uncovered horizontal space between the two sets of detector elements 321, 322 so that no vertical line through the infrared detector 320 can intersect more than one detector element, and some possible vertical lines through the infrared detector 320 will not intersect any detector elements. The two sets of detector elements 321, 322 do overlap vertically, however, so that at least one horizontal line may intersect all four detector elements in this embodiment.

A fourth alternate embodiment of an infrared detector 330 includes a first set of four serially coupled detector elements 331, a second set of four serially coupled detector elements 332, a third set of four serially coupled detector elements 333, and a fourth set of serially coupled detector elements 334. The four sets of detector elements 331-334 are non-overlapping in the vertical direction. The first set of detector elements 331 and the third set of detector elements 333 are horizontally aligned with each other, and the second set of detector elements 332 and the fourth set of detector elements 334 are horizontally aligned with each other, but have a non-quadrature offset from the first set 330 and third set 333.

A wide variety of embodiments are envisioned for various embodiments of infrared detectors. Various embodiments can have any number of sets of detector elements with any number of detector elements per set. The sets can be overlapping or non-overlapping in a first direction, but at least some sets are offset from other sets in a direction orthogonal to the first direction. The offset can be a quadrature offset in some embodiments, but is a non-quadrature offset in other embodiments. The detector elements can be of any size and the individual detector elements of a set may or may not overlap with individual detector elements of adjacent sets in a direction orthogonal to the first direction, depending on the embodiment. Each set of detectors can have an individual outputs or can be coupled in parallel with one or more other sets of detectors, depending on the embodiment. In some embodiments, one end of each set of the serially coupled detector elements are coupled together to a ground terminal, and the other end of each set of the serially coupled detector elements has an individual output. In other embodiments, one end of each set of the serially coupled detector elements are coupled together to a ground terminal, and the other end of even rows of the serially coupled detector elements are coupled to one output, and odd rows of the serially coupled detector elements are couple to another output.

FIGS. 4A and 4B are a front and rear view of another embodiment of an infrared detector 400. The infrared detector includes a substrate 401 made with at least some pyroelectric material. The infrared detector 400 includes a first row of detector elements 412 that includes one detector element 430 that includes pad 413 on the front side 410 of the substrate 401 and pad 423 on the back side 420 of the substrate 401, and another detector element 440 that includes pad 414 on the front side 410 of the substrate 401 and pad 424 on the back side 420 of the substrate 401. Note that pad 423 is opposite of pad 413 on the substrate 401, and pad 424 opposite of pad 414 on the substrate 401. The two detector elements 430, 440 of the first row of detector elements 412 are positioned on the substrate 401 in a row direction (horizontal in FIG. 4A/B) spaced a pitch distance 431 apart. In the embodiment shown, the two detector elements 430, 440 are approximately the same size. The first row of detector elements 412 includes at least two serially coupled detector elements 430, 440 coupled between the output pad 422 and the output pad 425. In the embodiment shown, the detector element 430 is configured to provide a positive voltage between the output pad 425 and the output pad 422 in response to an increase in temperature, and the detector element 440 is configured to provide a negative voltage between the output pad 425 and the output pad 422 in response an increase in temperature.

The infrared detector 400 also includes a second row of detector elements 416 that includes one detector element 470 that includes pad 417 on the front side 410 of the substrate 401 and pad 427 on the back side 420 of the substrate 401, and another detector element 480 that includes pad 418 on the front side 410 of the substrate 401 and pad 428 on the back side 420 of the substrate 401. Note that pad 427 is opposite of pad 417 on the substrate 401, and pad 428 is opposite of pad 418 on the substrate 401. The two detector elements 470, 480 of the second row of detector elements 418 are positioned on the substrate 401 in a row direction that is parallel to the first row 412, and spaced a pitch distance 432 apart that is about the same as the pitch distance 431 of the first row 412. In the embodiment shown, all four detector elements 430, 440, 470, 480 are approximately the same size. The second row of detector elements 416 includes at least two serially coupled detector elements 470, 480 coupled between the output pad 426 and the output pad 429. In the embodiment shown, the detector element 470 is configured to provide a positive voltage between the output pad 429 and the output pad 426 in response to an increase in temperature, and the detector element 480 is configured to provide a negative voltage between the output pad 429 and the output pad 426 in response to an increase in temperature.

In the embodiment of FIG. 4A/B, the first row of detector elements 412 and the second row of detector elements 416 are substantially non-overlapping. Substantially non-overlapping, as used herein and in the claims, means that more than 80% of the height (i.e. the dimension orthogonal to the row direction, or vertical in FIG. 4A/B) of detector elements 430, 440 of the first row 412 do not overlap with the detector elements 470, 480 of the second row 418. The detector elements 470, 480 of the second row 416 are, however, are positioned at a non-zero offset 433 from the first row of detector elements 412 in the row direction (horizontal in FIG. 4A/B). The offset 433 can be characterized as a percentage of the pitch distance 431, 432. In some embodiments, the non-zero offset is between about 5% of the pitch distance and about 95% of the pitch distance. In some embodiments, the offset 433 is about half of the pitch distance 431, 432 and can be referred to as a quadrature offset. In some embodiments, the offset 433 is not equal to one half of the pitch distance 431, 432, and the offset 433 can be referred to as a non-quadrature offset.

FIG. 4C is a schematic of the embodiment of the infrared detector 400 of FIG. 4A/B. The first row of serially coupled detector elements 412 are shown as polarized capacitors 430, 440 to indicate the polarity of voltage generated by the detector element in response to an increase in temperature. The electrodes of the capacitors 430, 440 are marked with the reference number of its corresponding pad of the detector element. So the detector element, or capacitor, 430 includes pad 423 and pad 413, and detector element, or capacitor, 440 includes pad 414, and pad 424. The first row of detector elements 412 is coupled to the output pad 422 and to the output pad 425.

The second row of serially coupled detector elements 416 are shown as polarized capacitors 470, 480 to indicate the polarity of voltage generated by the detector element in response to an increase in temperature. The electrodes of the capacitors 470, 480 are marked with the reference number of its corresponding pad of the detector element. So the detector element, or capacitor, 470 includes pad 427 and pad 417, and detector element, or capacitor, 480 includes pad 418, and pad 428. The second row of detector elements 416 is coupled to the output pad 426 and to the output pad 429. In at least some embodiments, the output pad 425 and output pad 429 are coupled to ground, and the output pad 422 is a first output of the infrared detector 400, and the output pad 426 is the second output of the infrared detector 400.

FIG. 4D is an isometric view of an embodiment of a packaged version 490 of the infrared detector 400 of FIG. 4A/B. The packaged version 490 includes a package 491 with the substrate 401 of the infrared detector 400 mounted inside of the package 491 behind a mid-IR-transmissive window (or window/filter) in a way to allow external mid-IR electromagnetic energy to affect the substrate 401 of the infrared detector 400 while at the same time shielding the substrate 401 from non-mid-IR influences. The packaged version 490 includes at least one terminal 492-499 accessible from outside of the package. In at least one embodiment, the output terminal 492 is coupled to the output pad 422, the output terminal 495 is coupled to the output pad 425, the output terminal 496 is coupled to the output pad 426, and the output terminal 499 is coupled to the output pad 429. Some embodiments of the packaged version 490 include circuitry, such as shown if FIG. 5A-D, mounted in the package 491 and coupled between the infrared detector 400 and the at least one output terminal 492-499.

Figure 5A:
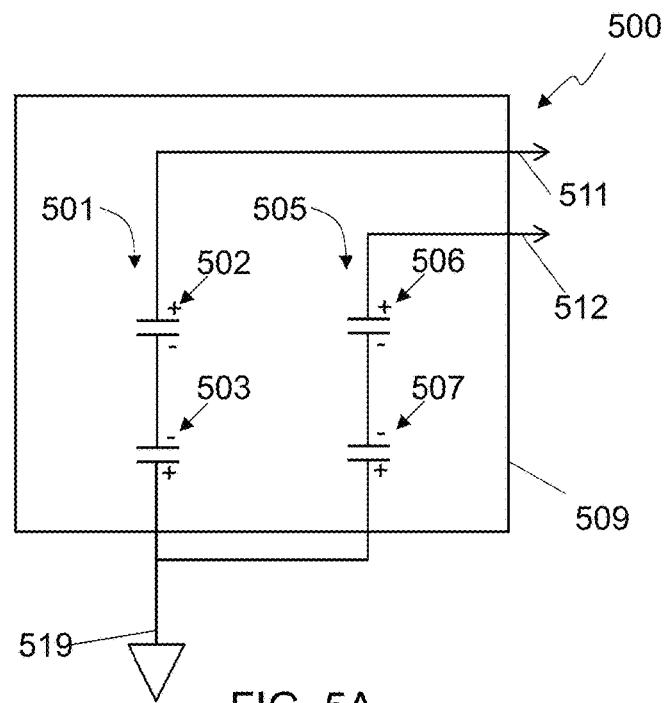
FIG. 5A-D show embodiments of circuitry for use with an infrared detector.

FIG. 5A-D show embodiments of circuitry for use with an infrared detector 100 of FIG. 1A-D or an infrared detector 400 of FIG. 4A-D. FIG. 5A shows a schematic of an embodiment of a packaged infrared detector 500. The packaged infrared detector 500 includes a substrate 509 having two sets of detector elements. The first set of detector elements 501 includes a first detector element 502 serially coupled to a second detector element 503. The second set of detector elements 505 includes a first detector element 506 serially coupled to a second detector element 507. Circuitry, that in the embodiment shown in FIG. 5A is limited to conductors such as bonding wires, couples one end of both the first set of detector elements 501 and the second set of detector elements 505 to a ground terminal 519. The circuitry also couples the other end of the first set of detector elements 501 to a first output 511, and the other end of the second set of detector elements 505 to a second output 512.

So in the embodiment shown in FIG. 5A, the infrared detector includes a first set of detector elements 501 and a second set of detector elements 505, a first output 511, a second output 512, and a ground terminal. In this embodiment, the first set of detector elements 501 consists of a first detector element 502 and a second detector element 503, and the second set of detector elements 505 consists of a third detector element 506 and a fourth detector element 507. The first 502, second 503, third 506 and fourth detector elements 507 each include a capacitor with the substrate 509 as a dielectric. In this embodiment, the first output 511 is connected to a first terminal of the first detector element 502, a second terminal of the first detector element 502 is connected to a first terminal of the second detector element 503, and a second terminal of the second detector element 503 is connected to the ground terminal 519. In this embodiment, the second output 512 is connected to a first terminal of the third detector element 506, a second terminal of the third detector element 506 is connected to a first terminal of the fourth detector element 507, and a second terminal of the fourth detector element 507 is connected to the ground terminal 519.

Figure 5B:
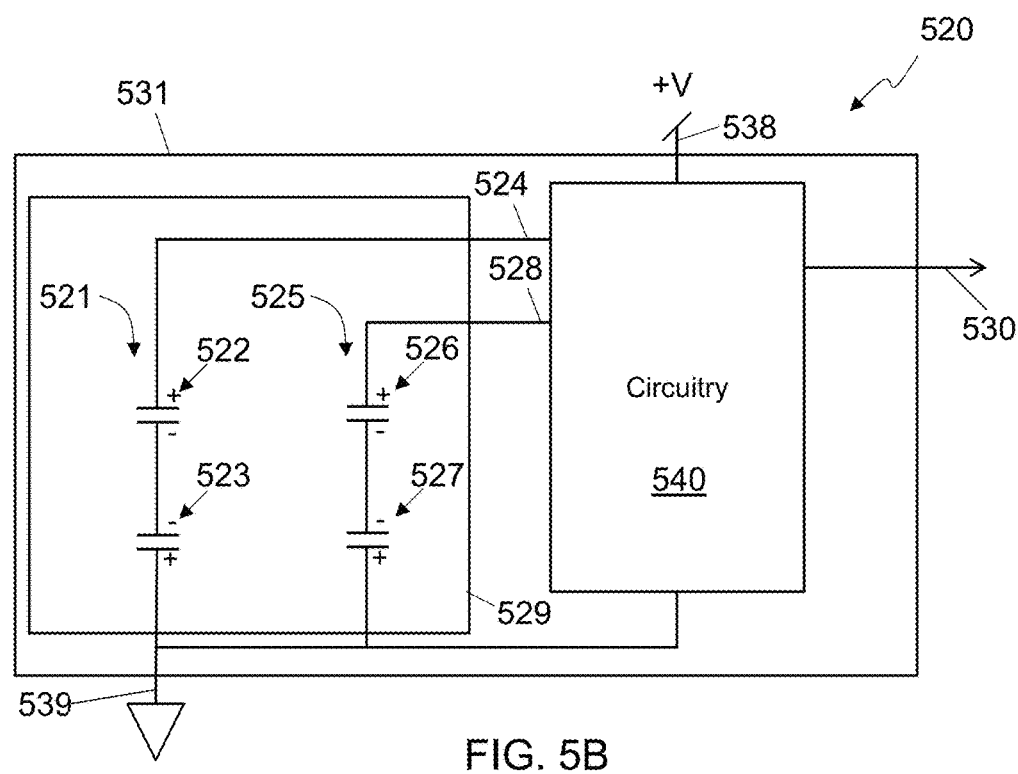

FIG. 5B shows a schematic of an embodiment of a packaged infrared detector 520 that includes a substrate 529 having two sets of detector elements 521, 525. The packaged infrared detector 520 includes circuitry 540, mounted in the package 531, and coupled to the package outputs 530, 538, 539, the first set of detector elements 521, and second set of detector elements 525. The first set of detector elements 521 includes a first detector element 522 serially coupled to a second detector element 523. The second set of detector elements 525 includes a first detector element 526 serially coupled to a second detector element 527. One end of both the first set of detector elements 521 and the second set of detector elements 525 are coupled to a ground terminal 539. The other end of the first set of detector elements 521 is coupled to a first input 524 of the circuitry 540, and the other end of the second set of detector elements 525 is coupled to a second input 528 of the circuitry 540. The circuitry 540 is also coupled to the power terminal 538 to provide power to the circuitry 540, and the ground terminal 539. One or more outputs of the circuitry 540 are coupled to outputs 530 of the packaged infrared detector 520. In some embodiments, the circuitry 540 can detect a first pyroelectric effect on the first set of detector elements 521 and a second pyroelectric effect on the second set of detector elements 525, and provide information about the first pyroelectric effect and the second pyroelectric effect at the at least one output terminal 530. In some embodiments, the information is provided in the form of one or more analog waveforms. In other embodiments, the information is provided as digital data. Some embodiments may provide the information as a combination of analog and digital information.

Figure 5C:
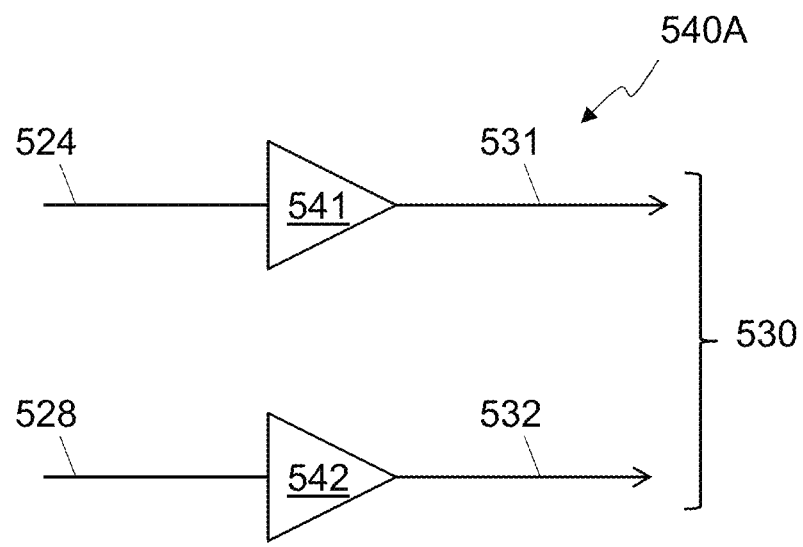

FIG. 5C shows an embodiment of circuitry 540A suitable for use in the packaged infrared detector 520 as circuitry 540. The first input 524 is coupled to a first transistor buffer 541 and the second input 528 is coupled to a second transistor buffer 542. The first transistor buffer 541 and second transistor buffer 542 can be of any design, ranging from a single transistor buffer to a full operational amplifier based design, and can use any type of transistor, including bipolar transistors, depletion-mode field-effect transistors, and enhancement-mode field-effect transistors, as well as other passive or active electronic components such as, but not limited to, diodes, resistors, and capacitors, depending on the embodiment. In one embodiment, the transistor buffers 541, 542 have a unity gain, but other embodiments may provide non-unity gain to change the voltage range of the output from that generated by the pyroelectric effect. The first transistor buffer 541 drives output 531, which is one of the at least one output terminal 530, with a first analog voltage waveform to provide information about the pyroelectric effect on the first set of detector elements 521. The second transistor buffer 542 drives output 532, which is one of the at least one output terminal 530, with a second analog voltage waveform to provide information about the pyroelectric effect on the second set of detector elements 525.

Figure 5D:
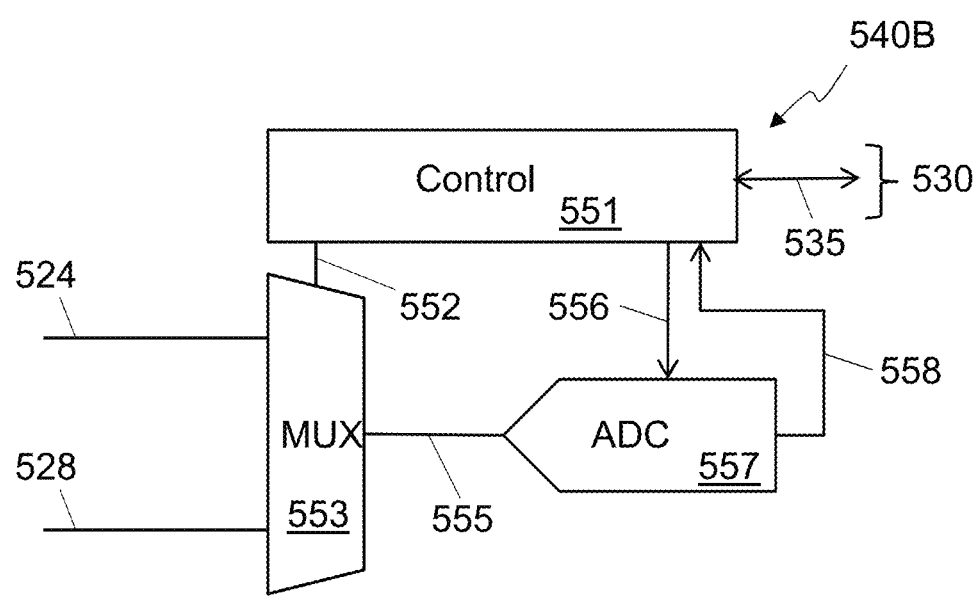

FIG. 5D shows an embodiment of circuitry 540B suitable for use in the packaged infrared detector 520 as circuitry 540. The circuitry 540B includes control circuitry 551 with an output 552 coupled to an analog multiplexer 553 to select one of the two inputs 524, 528 to provide as an input 555 to an analog-to-digital converter (ADC) 557. The ADC 557 can have any resolution, depending on the embodiment, but the ADC 557 is a monotonic 14 bit ADC in at least one embodiment. The control circuitry 551 also controls the ADC 557 using one or more control lines 556, and the output 558 of the ADC 557 is made available at the at least one output terminal 530. So in at least one embodiment, the circuitry 540B includes at least one analog-to-digital converter 557, and the information about the first pyroelectric effect and the second pyroelectric effect at the at least one output terminal 530 includes digital data representing at least one voltage waveform.

In some embodiments, the control circuitry 551 includes one or more control lines coupled to external control terminals of the package, with the output of the ADC 558 directly available on external terminals, but in the embodiment shown, the control circuitry 551 receives the output 558 of the ADC 557 and communicates over a bidirectional input/output (I/O) line 535, which is one of the at least one output terminal 530. Any protocol can be used on the I/O line 535, but in one embodiment, a capture and transmission cycle on the I/O line 535 is started by an external device by holding the I/O line 535 low for at least a first predetermined period of time, then driving it high and releasing it. The control circuitry 551 detects this and uses the mux control line 552 to select the first input 524. The control circuitry 551 then uses the ADC control lines 556 to have the ADC 557 convert the voltage of the first input 524 to a digital value on the ADC output 558, where it is captured by the control circuitry 551. Once the digital value of the first input 524 has been captured, the control circuitry 551 uses the mux control line 552 to select the second input 528. The control circuitry 551 then uses the ADC control lines 556 to have the ADC 557 convert the voltage of the second input 528 to a digital value on the ADC output 558, where it is captured by the control circuitry 551.

After the I/O line 535 has been driven high and released by the external device, the control circuitry 551 drives one bit of information from the captured digital values on the I/O line 535 for a second predetermined period of time and then releases the I/O line 535. The external device waits for at least the second predetermined period of time, captures the value of the I/O line 535, and then drives the I/O line 535 low and back high again. The control circuitry 551 detects the low to high transition and repeats the process for the next bit of information. This continues until all the digital information from the ADC output 558 has been transferred. Other embodiments use different protocols to transfer the digital information on one or more lines. Some embodiments may include multiple ADCs and multiple outputs to allow for faster and/or simpler access to the digital information.

Figure 6A:
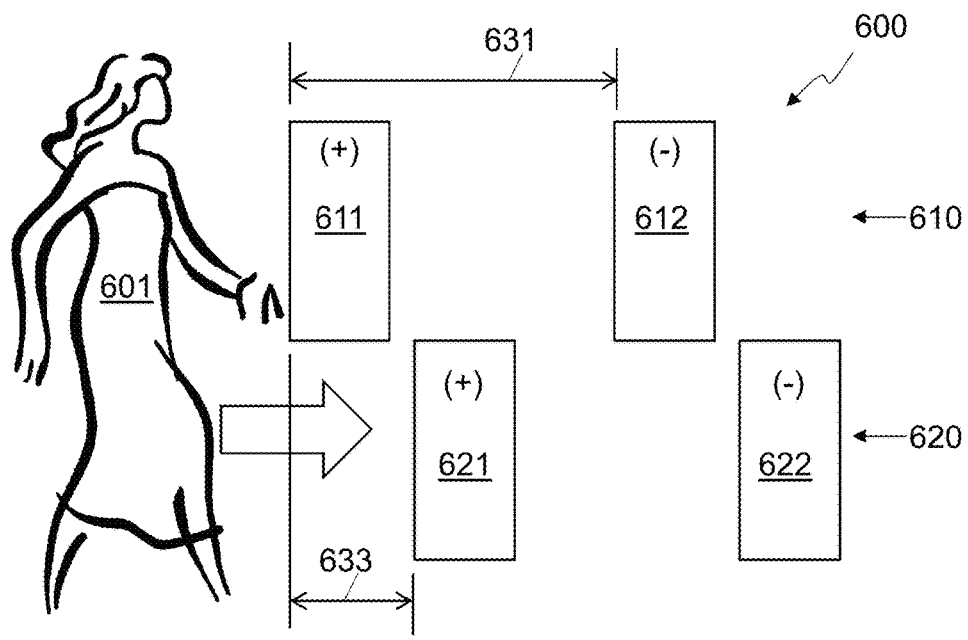
FIGS. 6A and 6B show examples of a person and an animal, respectively, walking through monitored volumes of an embodiment of a motion sensor.
Figure 6B:
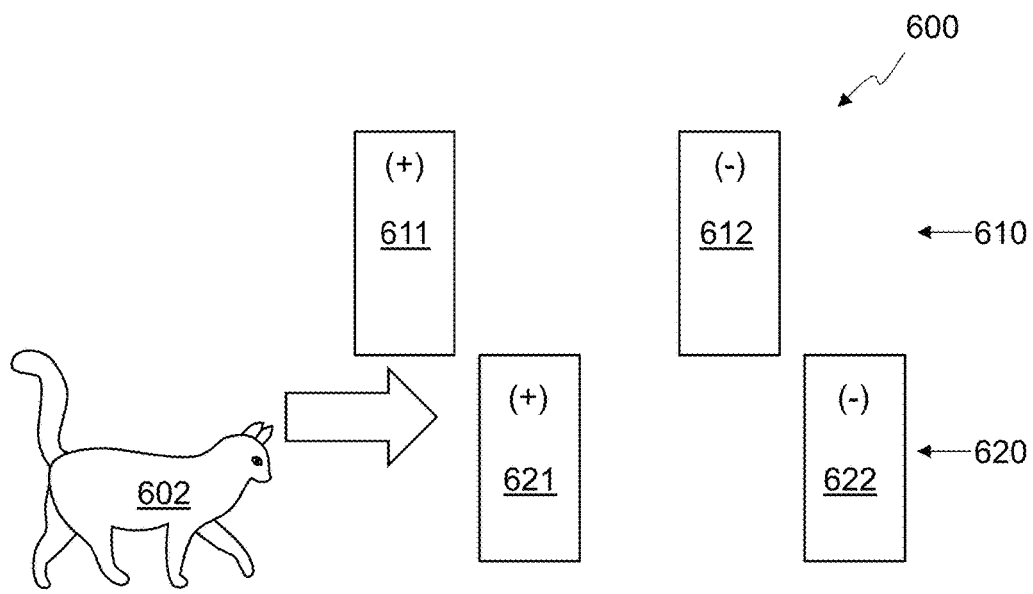

FIGS. 6A and 6B show examples of a person 601 and an animal 602, respectively, walking through a monitored space 600 of an embodiment. The monitored space 600 includes several monitored volumes whose cross-sections, where the person 601 or animal 602 is passing through, are shown as rectangles, although other embodiments can have other shapes for the monitored volumes. A first monitored volume 611 and a second monitored volume 612 are included in a first row of monitored volumes 610, and a third monitored volume 621 and fourth monitored volume 622 are included in a second row of monitored volumes 620. In the embodiment shown, the first row of monitored volumes 610 and the second row of monitored volumes 620 are substantially non-overlapping. Other embodiments have more than two rows of monitored volumes for at least some intersecting planes of the monitored space 600.

The first row of monitored volumes 610 in the monitored space 600 have a pitch 631, or distance between the monitored volumes 611, 612, that is about the same as the pitch of the second row of monitored volumes 620. The second row of monitored volumes 620, however, has a non-zero offset 633 from the first row of monitored volumes 610 in the monitored space 600. The offset 633 is in the same direction of the flow of the rows, or horizontal in FIG. 6A/B. One way of measuring the offset 633 is to find the distance from the left edge of the first monitored volume 611 to the left edge of the third monitored volume 621. The offset 633 can also be calculated as a percentage of the pitch 631, or as a phase angle, where the phase angle is equal to:

$$\varphi = 180° \times \frac{\text{Offset}}{\text{Pitch}}$$

In various embodiments, the non-zero offset 633 can be any non-zero value, but in most embodiments, the non-zero offset 633 will be no greater than the pitch. So in many embodiments, the offset is limited to:

$$0° < \varphi < 180°$$

In some embodiments, the phase angle is about 90°, so that the thermal information from the first row 610 and the thermal information from the second row 620 are quadrature signals, but in other embodiments, the phase angle is not close to 0°, 90°, or 180°, so that:

$$10° \leq \varphi \leq 80° \cup 100° \leq \varphi \leq 170°$$

In FIG. 6A, the person 601 is passing through the monitored space 600 from left to right. As the person 601 moves, she first moves into the first monitored volume 611 of the first row of monitored volumes 610. Thermal information from the person 601 is directed onto a detector element of an infrared detector in a motion sensor that is monitoring the first monitored volume 611. As the person 601 continues to move, thermal information from the person 601 is directed onto the various detector elements of the infrared detector in the motion sensor. As the person 601 moves out of the first monitored volume 611, she moves into the third monitored volume 621, then into the second monitored volume 612 and finally into the fourth monitored volume 622. In at least some embodiments, the thermal information from the first row of monitored volumes 610 is based on a positive contribution to the thermal information by a hot object in the first monitored volume 611 and a negative contribution to the thermal information by a hot object in the second monitored volume 612, and the thermal information from the second row of monitored volumes 620 is based on a positive contribution to the thermal information by a hot object in the third monitored volume 621 and a negative contribution to the thermal information by a hot object in the fourth monitored volume 622.

In some embodiments, the motion sensor includes circuitry coupled to the infrared detector to detect a phase relationship of waveforms extracted from the thermal information from the first row of monitored volumes 610 and the thermal information from the second row of monitored volumes 620. The circuitry in the motion sensor can then generate an animal-immune (major motion) indication if the phase relationship corresponds to a critical phase angle, where the critical phase angle is greater than 0 degrees and is based on the offset 633 and the pitch 631.

It should be noted that, for many different reasons, a phase relationship, or phase delay, ($\varphi'$) can correspond to a critical phase angle ($\varphi$) without being exactly equal. To allow for motion in various directions, as well as variations in the way that the angles are calculated, some embodiments use the absolute value of the phase delay ($|\varphi'|$) to determine if the phase delay corresponds to the critical phase angle. Some embodiments also normalize the angles so that both the phase delay and the critical phase angles are between 0° and 180° for the determination of correspondence. Some embodiments also determine that the phase angle corresponds to the critical phase angle if:

$$180° - |\varphi'| \approx \varphi$$

In some embodiments, a predetermined tolerance factor is used so that if the phase delay differs from the critical phase angle by less than the tolerance factor, the two are deemed to be corresponding. The tolerance factor allows for some variation in the speed or path of the moving object to be tolerated and still generate a valid detection of motion. The predetermined tolerance factor varies in different embodiments, but is ±10° in at least one embodiment and ±6% of the pitch in another embodiment. In some embodiments, the tolerance factor varies, depending on the magnitude of the waveforms or a correlation factor between the two waveforms.

In FIG. 6B, the animal 602 is passing through the monitored space 600 from left to right. As the animal 602 moves, it first moves into the third monitored volume 621 of the second row of monitored volumes 620 without entering into the first monitored volume 611 of the first row of monitored volumes 610 because it is not tall enough to enter the first row of monitored volumes 610. Thermal information from the animal 602 is directed onto a detector element of an infrared detector in a motion sensor that is monitoring the third monitored volume 621. As the animal 602 continues to move, thermal information from the animal 602 is directed onto the various detector elements of the infrared detector in the motion sensor. As the animal 602 moves out of the third monitored volume 621, it moves into the fourth monitored volume 622 without entering into the second monitored volume 612. So thermal information from the animal 602 is available from the second row of monitored volumes 620, but because the animal 602 is not tall enough to reach the first row of monitored volumes 610 of the monitored space 600, no thermal information from the animal 602 is available from the first row of monitored volumes 610. This allows embodiments to differentiate between a human 601 and an animal 602 moving through the monitored space 600.

Figure 7A:
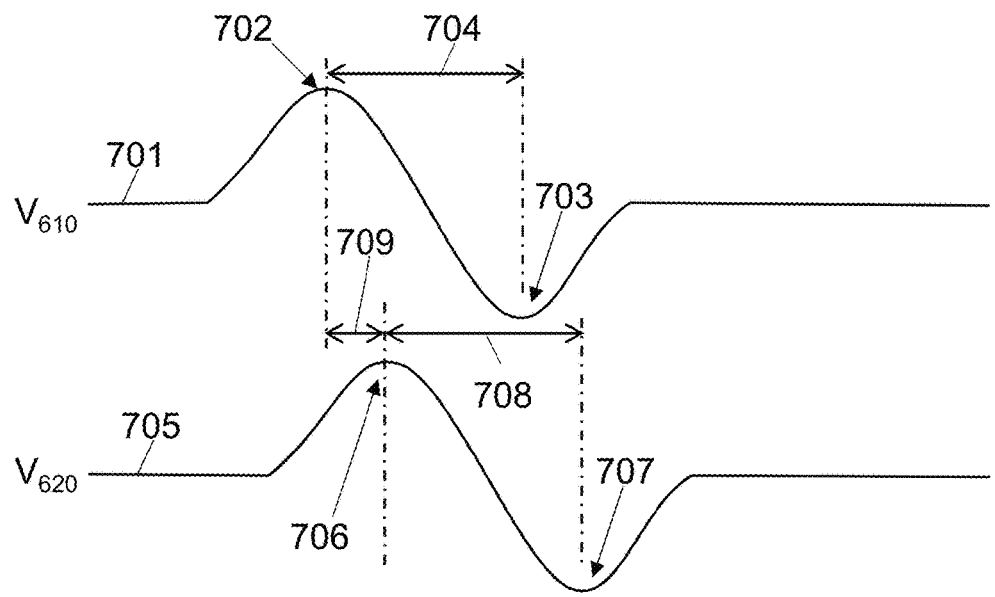
FIGS. 7A and 7B are example waveforms from an embodiment of an infrared detector in the motion sensor of FIGS. 6A and 6B, respectively.
Figure 7B:
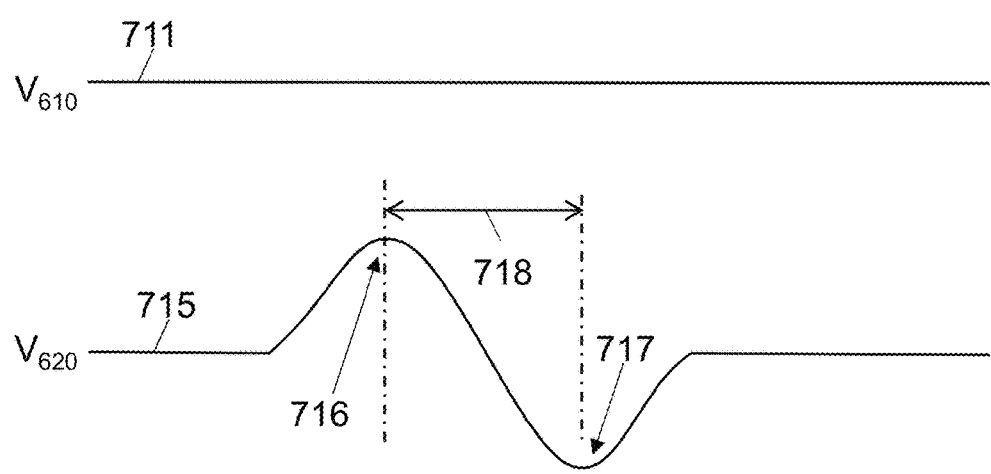

FIGS. 7A and 7B show example waveforms from an embodiment of an infrared detector in the motion sensor of FIGS. 6A and 6B. FIG. 7A shows a first waveform 701 that represents thermal information from the first row of monitored volumes 610 and a second waveform 705 that represents thermal information from the second row of monitored volumes 620 as the human 601 walks through the monitored space 600. As the human 601 passes into the first monitored volume 611, the voltage of the first waveform 701 begins to rise to the peak 702. Then as the human 601 passes from the first monitored volume 611 into the third monitored volume 621, the voltage of the first waveform 701 begins to fall, and the voltage of the second waveform 705 begins to rise to the peak 706. As the human 601 passes from the third monitored volume 621 to the second monitored volume 612, the second waveform 705 begins to fall and the first waveform 701 falls to a valley 703. As the human 601 passes from the second monitored volume 612 to the fourth monitored volume 622 the first waveform 701 begins to rise and the second waveform 705 falls to the valley 707, and then begins to rise again as the human 601 leaves the fourth monitored volume 622.

The first waveform 701 shows a half-period 704 which is based on the pitch 631 of the first row of monitored volumes 610 and the speed at which the human 601 traverses the monitored space 600. Because the second row of monitored volumes 620 has the same pitch as the first row 610, and the human is moving through the second row of monitored volumes 620 at the same speed that she is moving through the first row, the half-period 708 of the second waveform 705 is about the same as the half-period 704 of the first waveform 701. But because the second row of monitored volumes 620 has a non-zero offset 633 from the first row 610, the second waveform 705 has a phase delay 709 from the first waveform 701. By detecting that the first waveform 701 and the second waveform 705 are separated by a phase delay 709 that corresponds to the critical phase angle calculated from the pitch 631 of the monitored volumes, and the non-zero offset 633 of the second row of monitored volumes 620 from the first row of monitored volumes 610, an animal-immune motion detection can be achieved by embodiments.

FIG. 7B shows a first waveform 711 that represents thermal information from the first row of monitored volumes 610 and a second waveform 715 that represents thermal information from the second row of monitored volumes 620 as the animal 602 walks through the monitored space 600. As the animal 602 passes under the first monitored volume 611, the voltage of the first waveform 711 is unaffected. Then as the animal 602 passes into the third monitored volume 621, the voltage of the second waveform 715 begins to rise to the peak 716. As the animal 602 passes from the third monitored volume 621 and under the second monitored volume 612, the second waveform 715 begins to fall and the first waveform 711 remains unaffected. As the animal 602 enters into the fourth monitored volume 622, the second waveform 715 falls to the valley 717, and then begins to rise again as the animal 602 leaves the fourth monitored volume 622.

The first waveform 711 is unaffected by the animal 602, because the animal 602 is not tall enough to enter the first row of monitored volumes 610. The second waveform 711 shows a half-period 718 which is based on the pitch of the first row of monitored volumes 610 and the speed at which the animal 602 traverses the monitored space 600. By detecting that the difference between the two waveforms 711, 715 is greater than a predetermined threshold, a minor motion detection can be achieved by embodiments. Some embodiments may perform additional signal processing on the two waveforms to smooth the difference or otherwise process the individual waveforms of the difference waveform to reduce false positives or increase detection rates.

While it is not shown in FIG. 7A/B, an overall change in ambient temperature, or a mechanical shock could result in the two waveforms from the infrared detector being nearly equivalent, with no phase delay, as shown in FIG. 2B. By detecting that the first waveform and the second waveform do not have a phase difference, and that the difference between the two waveforms does not exceed a predetermined threshold, false positives can be reduced by embodiments.

FIG. 6A/B and FIG. 7A/B together show how a method of discriminating human motion from animal motion within an infrared detection area, or monitored space 600, is implemented in some embodiments. Infrared intensity from within the infrared detection area 600 is sensed. At least two stacked non-overlapping detection tiers, 610, 620 are provided within the infrared detection area 600. Each detection tier 610, 620 includes a plurality of non-overlapping monitored volumes. The plurality of non-overlapping monitored volumes of the at least two detection tiers 610, 620 are shifted from each other in a horizontal direction by an offset 633. A change in the infrared intensity that occurs in only one detection tier of the at least two stacked non-overlapping detection tiers is ignored by some embodiments, as it may have been caused by an animal, although some embodiments may generate a minor motion indication, or in some embodiments in some modes a general motion indication, in response to a change in only one detection tier. A motion indication indicative of a presence of a human is generated by embodiments in response to registering sufficient changes in the infrared intensity on vertically adjacent detection tiers of the at least two stacked detection tiers having a phase relationship that corresponds to a critical phase angle. The critical phase angle can be calculated as 180 degrees times a percentage of a pitch 631 of the non-overlapping monitored volumes represented by the offset 633, and is greater than 0 degrees. In some embodiments, the critical phase angle is between about 10 degrees and about 80 degrees or between about 100 degrees and about 170 degrees. Changes in the infrared intensity on vertically adjacent detection tiers of the at least two stacked detection tiers having a phase relationship that does not correspond to the critical phase angle are ignored by embodiments. The method is implemented by computer code in some embodiments, which is stored on at least one machine readable medium.

Figure 8:
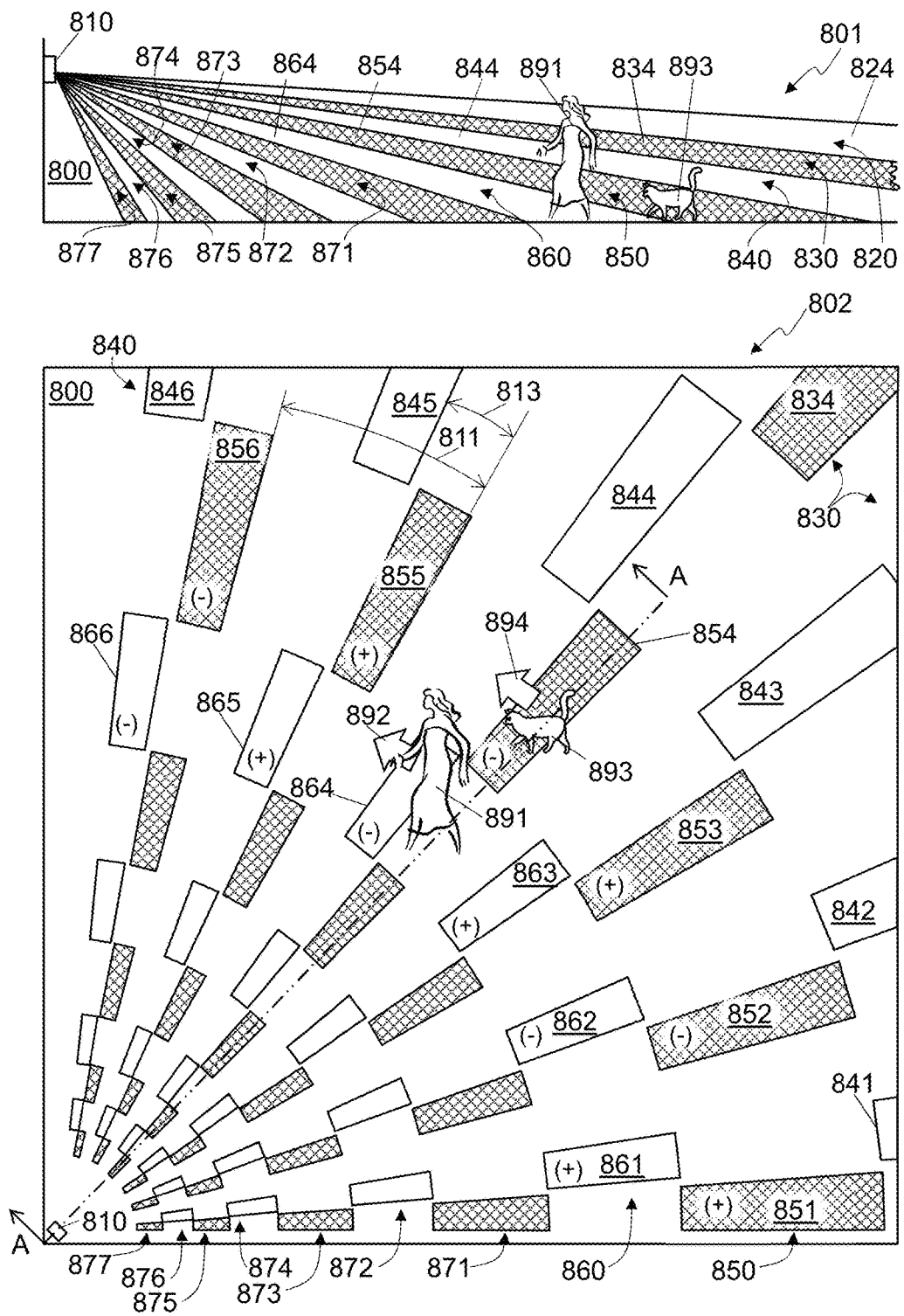
FIG. 8 shows a side view and a top view of an embodiment of monitored volumes for a motion sensor in a room.

FIG. 8 shows a side view 801 and a top view 802, respectively, of an embodiment of monitored volumes for a motion sensor 810 in a room 800. Side view 801 shows a vertical planar cross-section of the room 800 as shown by the cross-section line A:A in top view 802. Looking first at the side view 801, the motion sensor 810 is mounted on a wall of the room 800. The motion sensor 810 can be mounted at any height, depending on the embodiment, but in the embodiment shown, the motion sensor 810 is mounted at a height somewhat above the average height of a human, or about 2 meters (m) above the floor. The motion sensor 810 monitors several tiers, or rows, of monitored volumes that project from the motion sensor 810 at different elevations. In the side view 801, the monitored volumes without hatch lines, such as monitored volume 824, are behind the cross-sectional plane A:A, and the monitored volumes with the hatch lines, such as monitored volume 834, are intersected by the cross-sectional plane A:A. The various tiers intersect the floor of the room 800 in arcs, as shown in the top view 802. The locations where the even numbered tiers hit the floor are shown without hatch lines, and the locations where the odd numbered tiers hit the floor are shown with hatch lines in the top view 802.

Looking now at both the side view 801 and the top view 802 together, the highest tier 820, which includes the monitored volume 824 and is considered an even numbered tier, does not hit the floor of the room 800 due to its small angle of downward deflection and the size of the room. The tier 820 includes other monitored volumes that are not shown because they don't hit the floor of the room 800, but are consistent with the pattern of the other even numbered tiers. Monitored volume 834 is a part of the second highest tier 830, which is considered an odd numbered tier, and also includes other monitored volumes that do not hit the floor of the room 800, but are consistent with the pattern of the other odd numbered tiers. The next even numbered tier 840 includes monitored volumes 841-846, the next odd numbered tier 850 includes monitored volumes 851-856, and the next even numbered tier 860 includes monitored volumes 861-866. Additional alternating odd tiers 871, 873, 875, 877 and even tiers 872, 874, 876 each include a set of monitored volumes. The number of tiers and number of monitored volumes per tier shown in FIG. 8 are shown as an example, but any number of tiers and monitored volumes per tier can be used in various embodiments. Other embodiments can include more, or fewer, tiers, or rows, of monitored volumes. Other embodiments can also include more or fewer monitored volumes in a tier. Some embodiments may include tiers with different numbers of monitored volumes than other tiers.

In the embodiment shown, a first set of monitored volumes includes two or more tiers of monitored volumes, the even tiers in this example, and a second set of monitored volumes that includes two or more tiers of monitored volumes, the odd tiers in this example, which are interleaved with the two or more tiers of monitored volumes of the first set of monitored volumes. In at least one embodiment, infrared rays from the first set of monitored volumes, or even tiers, are directed onto a first row, or set, of detector elements on an infrared detector in the motion sensor 810, and infrared rays from the second set of monitored volumes, or odd tiers, are directed onto a second row, or set, of detector elements on an infrared detector in the motion sensor 810.

The monitored volumes of a tier are spaced at a pitch 811, which can be measured in degrees for some embodiments. In the embodiment shown, the pitch 811 is about 15°, but the pitch can be any angle, depending on the embodiment. In embodiments, at least some of the tiers of both sets of monitored volumes have about the same pitch 811. The monitored volumes of the second set of monitored volumes are offset from the monitored volumes of the first set of monitored volumes by an offset 813. The offset can be any angle, but is no greater than the pitch in many embodiments. In the embodiment, shown the offset is about 5°, which is one third of the pitch.

A human 891 and an animal 893 are both shown in FIG. 8 but are to be considered independently, as if the other were not there, in the following discussions. As the human 891 moves through the room 800 in the direction 892, she passes through multiple monitored volumes of multiple tiers. At her initial location, the human 891 is intersecting monitored volume 854 of tier 850 and monitored volume 834 of tier 830, which are part of the second set of monitored volumes. Infrared radiation generated by the warmth of her body is directed from the two monitored volumes 834, 854 onto one or more detector elements in the motion sensor 810 In the embodiment, shown, infrared rays from the monitored volume 834 and the monitored volume 854 are both directed onto a second detector element of a second row of detector elements which generates a negative voltage in response to warming.

As the human 891 moves in the direction 892, she moves out of the monitored volume 854 and monitored volume 834, and into monitored volume 864, monitored volume 844, and monitored volume 824, which are a part of the first set of monitored volumes. In the embodiment shown, infrared rays from the monitored volume 864, monitored volume 844, and monitored volume 824 are directed onto a second detector element of a first row of detector elements that generates a negative voltage in response to warming.

As the human 891 continues to move in the direction 892, she moves out of the monitored volumes of the first set of monitored volumes and back into monitored volumes of the second set of monitored volumes, monitored volume 855 of tier 850 and a monitored volume of tier 830, from which infrared rays are directed onto a first detector element of the second row of detector elements that generates a positive voltage in response to warming. As the human 891 continues to move in the direction 892, she moves out of the monitored volumes of the second set of monitored volumes and back into monitored volumes of the first set of monitored volumes, monitored volume 865 of tier 860, monitored volume 845 of tier 840, and a monitored volume of tier 820, from which infrared rays are directed onto a first detector element of the first row of detector elements that generates a positive voltage in response to warming.

So as the human 891 moves through the room 800 in the direction 892, the infrared detector in the motion sensor 810 generates two waveforms, one for each row of detector elements. The two waveforms have about the same shape, but have a different phase, due to the offset 813 between the two sets of monitored volumes. The two waveforms created by the motion of the human 891 have a phase relationship that is about 60° different, which corresponds to the critical phase angle calculated by dividing the offset 813 by the pitch 811 and multiplying by 180°, (5/15)×180°=60°. Because the two waveforms have a phase difference that corresponds to the critical angle, motion of a human 891 is detected, and an animal-immune motion indication, which may also be referred to as a major motion indication or human motion indication, is generated which can be one or more of an audible indication, such as a siren or warning voice, a visual indication, such as turning on a light, or actuating a strobe light or rotating light, generating an indication on a wired circuit, such as closing a switch or sending an ethernet message, and/or sending a radio frequency message, such as a message sent over a Wi-Fi (IEEE 802.11) network or Zigbee (IEEE 802.15) network.

Looking now at motion of an animal 893 instead of the human 891, the animal 893 moves through the room 800 in direction 894. In its initial position, the animal 893 intersects monitored volume 854, with very little of the animal 893 intersecting with any other monitored volumes. As the animal 893 moves in the direction 894, he moves out of the monitored volume 854 and eventually into the monitored volume 855. As the infrared radiation generated by the warmth of the body of the animal 893 is directed onto the infrared detector of the motion sensor 810, a voltage is generated by the second row of detector elements, but not by the first row of detector elements, because there is very little infrared radiation from the animal 893 picked up from the first tier of monitored volumes and directed onto the first row of detector elements. So the two waveforms generated by the infrared detector in the motion sensor 810 have a different shape, and therefore do not really have a phase relationship.

So human motion is detected in embodiments by receiving a first output of an infrared detector representing a warm body passing through a first tier of monitored volumes, and receiving a second output of the infrared detector representing the warm body passing through a second tier of monitored volumes. The second tier of monitored volumes are located below the first tier of monitored volumes with a horizontal offset from the first tier of monitored volumes. An animal-immune motion indication is generated by embodiments based on a phase difference between the first output and the second output of the infrared detector corresponding to a critical phase angle. The critical phase angle can vary between embodiments, but is greater than 0° and is between about 10° and about 170° in some embodiments. Depending on the embodiment, the animal-immune motion indication can include a visual indication, an audible indication and/or sending a radio frequency message. In some embodiments, it is determined whether a smoothed difference between the first output and the second output exceeds a predetermined value after compensating for background levels of the first output and second output, and a minor motion indication generated in response to the smoothed difference exceeding the predetermined value. Some embodiments also include obtaining a mode setting for a minor motion detection which is used to determine whether or not to generate a minor motion indication. In some embodiments the human motion detection is implemented using a computer program product that includes at least one non-transitory computer readable storage medium having computer readable program code embodied therewith.

Figure 9A:
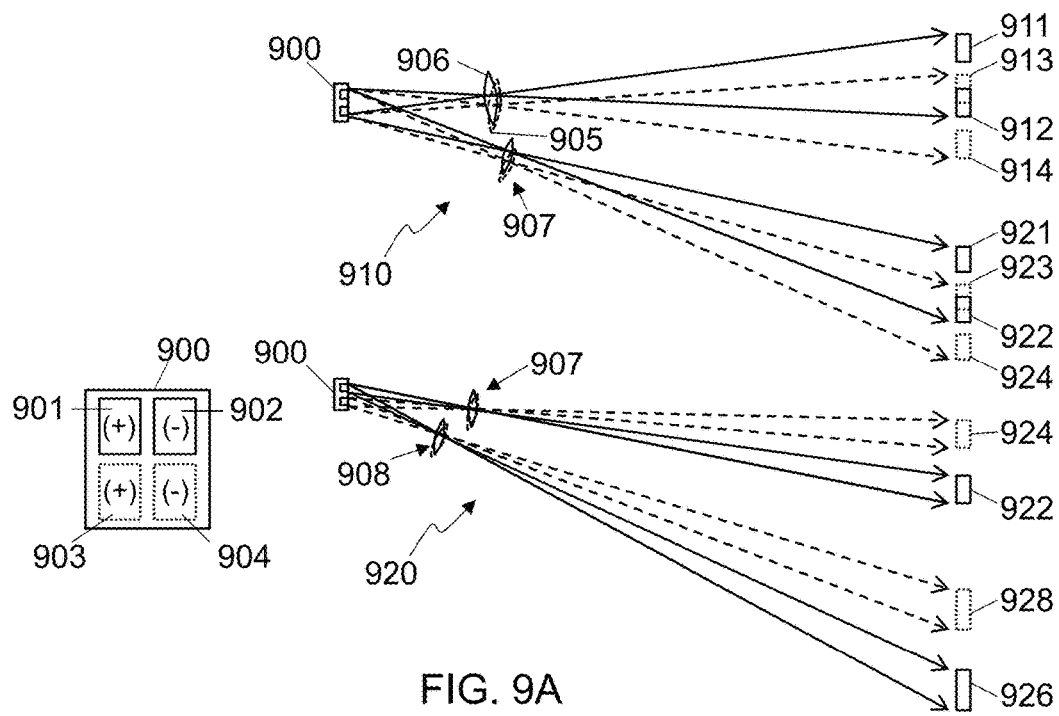
FIG. 9A-C show embodiments of optical systems for use in a motion sensor.
Figure 9B:
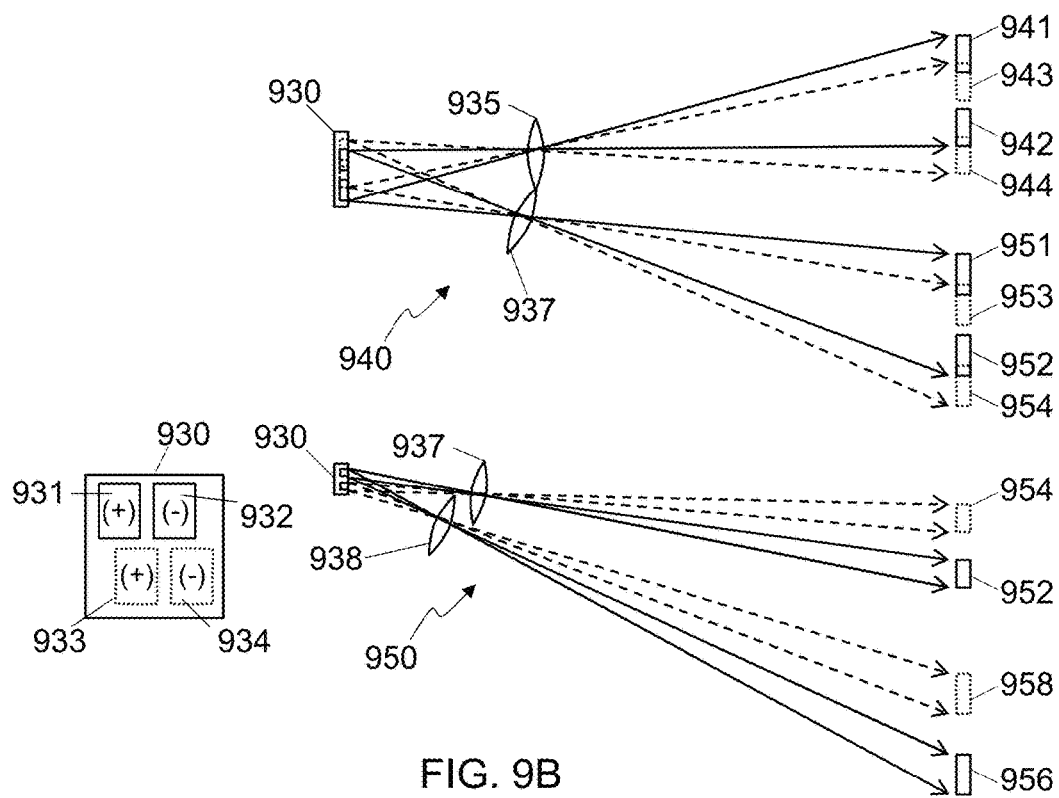
Figure 9C:
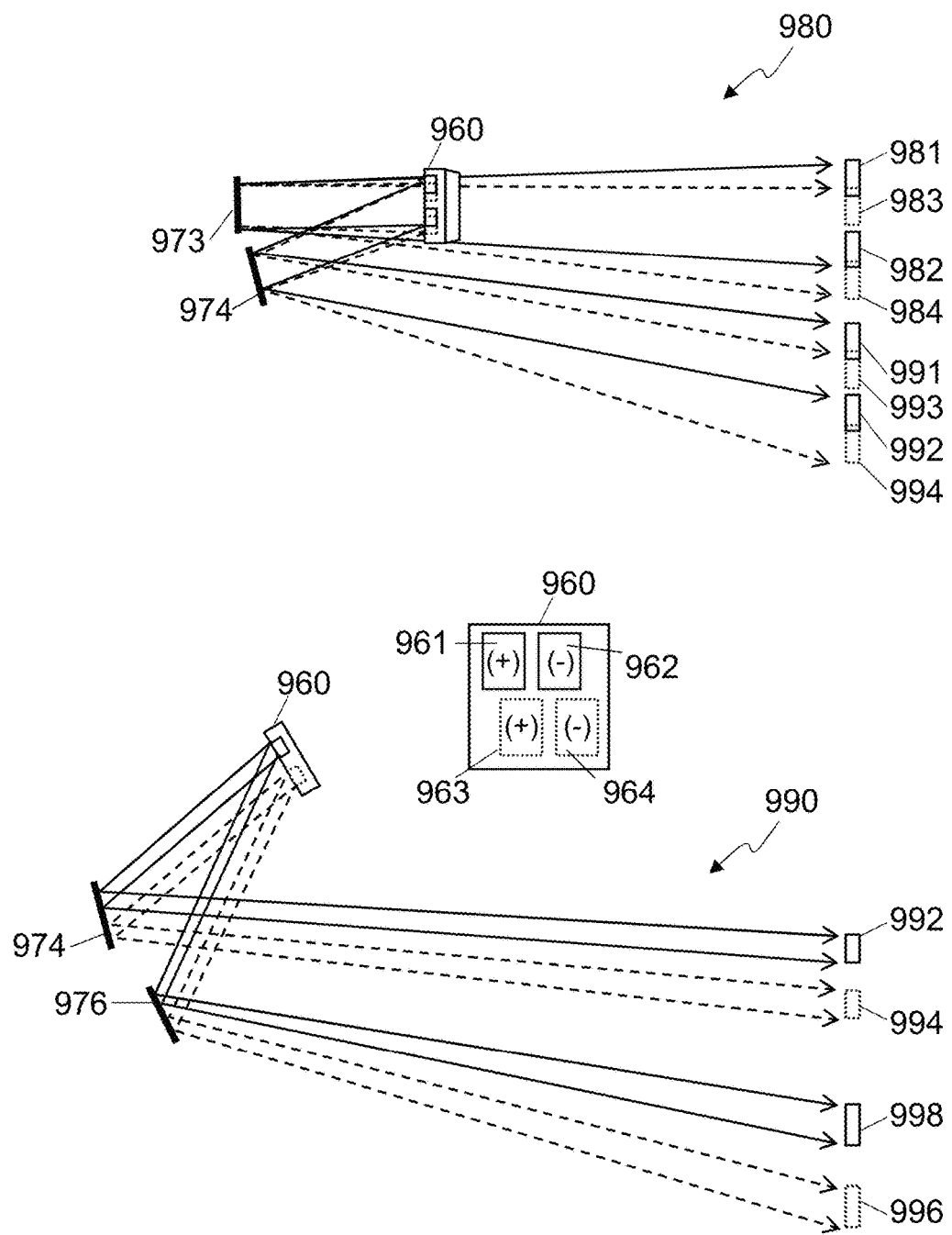

FIG. 9A-C show embodiments of optical systems for use in a motion sensor. FIG. 9A shows an embodiment that uses lenses to generate the offset between tiers of monitored volumes. The infrared detector 900 of FIG. 9A has a first row of two detector elements, detector element 901 and detector element 902, and a second row of two detector elements, detector element 903 and detector element 904, that is aligned with the first row of detector elements. The first detector element 901 of the first row is directly above the first detector element 903 of the second row, and the second detector element 902 of the first row is directly above the second detector element 904 of the second row. The front of the infrared detector 900 is shown.

FIG. 9A includes a top view 910 and a side view 920 of a few of the light paths for a subset of monitored volumes of an embodiment represented by projections of the monitored volumes on a wall. The first tier of monitored volumes includes monitored volume 913, monitored volume 914, monitored volume 923, and monitored volume 924. The second tier of monitored volumes includes monitored volume 911, monitored volume 912, monitored volume 921, and monitored volume 922. Both the first tier of monitored volumes and the second tier of monitored volumes are shown in the top view 910 but other lower tiers are not shown in the top view 910. The side view 920 shows the end monitored volume of four tiers, the first tier's end monitored volume 924, the second tier's end monitored volume 922, the third tier's end monitored volume 928 and the fourth tier's end monitored volume 926. Embodiments can include additional monitored volumes in each tier and/or more tiers.

In the embodiment of FIG. 9A, lenses, such as first lens 905 and second lens 906 direct electromagnetic radiation, such as infrared light, from the monitored volumes onto the detector elements of the infrared detector 900. The top of the infrared detector 900 is shown in the top view 910 and the left side of the infrared detector 900 is shown in the side view 920. The front of the infrared detector 900 is facing to the right in both the top view 910 and the side view 920. The first lens 905 is positioned to direct light from a portion of the first tier of monitored volumes onto the second row of detector elements, so that light from the monitored volume 913 is directed onto detector element 903 and light from the monitored volume 914 is directed onto detector element 904. The second lens 906 is positioned to direct light from an offset portion of the second tier of monitored volumes onto the first row of detector elements of the infrared detector 900, so that light from the monitored volume 911 is directed onto detector element 901 and light from the monitored volume 912 is directed onto detector element 902. Other lenses 907 direct other portions of the first and second tiers of monitored volumes onto the second and first rows of detector elements, respectively in the embodiment of FIG. 9A, so that light from the monitored volume 921 is directed onto detector element 901, light from the monitored volume 922 is directed onto detector element 902, light from the monitored volume 923 is directed onto detector element 903, and light from the monitored volume 924 is directed onto detector element 904.

Additional lenses direct portions of other tiers of monitored volumes onto the detector elements. In the example shown in the side view 920 of the embodiment of FIG. 9A, lenses 908 direct light from the monitored volume 928, as well as another monitored volume of that tier (not shown but behind monitored volume 928 in side view 920) on the second row of detector elements so the light from the monitored volume 928 is directed onto detector element 904 and the other monitored volume of that tier is directed onto detector element 903. The lenses 908 also direct light from the monitored volume 926, as well as another monitored volume of that tier (not shown but behind monitored volume 926 in side view 920) onto the first row of detector elements so the light from the monitored volume 926 is directed onto detector element 902 and the light from the other monitored volume of that tier is directed onto detector element 901.

A large number of individual lenses can be used in an embodiment, although some embodiments utilize one or more Fresnel lenses to direct the electromagnetic radiation as shown in FIG. 9A. For at least some embodiments utilizing an infrared detector with two rows of two aligned detector elements, an embodiment having four tiers of four monitored volumes includes at least eight lenses or different Fresnel elements. For at least some embodiments having 12 tiers of 6 monitored volumes as shown in FIG. 8, at least 36 lenses, or different Fresnel elements, are used. Some embodiments use one lens for each monitored volume.

In the embodiment of FIG. 9A, lenses are used to create an offset between tiers of monitored volumes even though there is no offset between rows, or sets, of detector elements on the infrared detector. So in some embodiments of a motion sensor, an infrared detector includes a first set of detector elements, and a second set of detector elements that are offset from the first set in a first detector direction (i.e. a direction on the substrate of the infrared detector) to create two rows of detector elements. The second set of detector elements are positioned without a significant offset from the first set of detector elements in a second detector direction that is orthogonal to the first detector direction (i.e. the sets, or rows, are aligned). In such embodiments, the optical system includes a first set of optical elements to direct the electromagnetic energy from the first set of monitored volumes onto the first set of detector elements on a first path having a first geometry. Lens 905 is an example of a lens of the first set of optical elements that directs electromagnetic energy from the first tier of monitored volumes onto the second row of detector elements on the path with the geometry shown by the dashed lines. The optical system also includes a second set of optical elements to direct the electromagnetic energy from the second set of monitored volumes onto the second set of detector elements on a second path having a second geometry that is different than the first geometry. Lens 906 is an example of a lens of the second set of optical elements that directs electromagnetic energy from the second tier of monitored volumes on the first row of detector elements on the path with the geometry shown by the solid lines. The embodiment shown in FIG. 9A might be used for a set of monitored volumes covering a small deflection angle. Embodiments may also include a horizontal blocking wall to separate the optical paths of the upper row of detector elements 901, 902 from the optical paths of the lower row of detector elements 903, 904. The horizontal blocking wall can be used to prevent lens 905 from directing electromagnetic energy from an additional monitored volume onto the upper row of detector elements 901, 902 and to prevent lens 906 from directing electromagnetic energy from an additional monitored volume onto the lower row of detector elements 903, 904.

FIG. 9B shows an embodiment that utilizes an offset between rows of detector elements to generate the offset between tiers of monitored volumes. The infrared detector 930 of FIG. 9B has a first row of two detector elements, detector element 931 and detector element 932, and a second row of two detector elements, detector element 933 and detector element 934, that have an offset from the first row of detector elements in a direction that is parallel to the row direction. The first detector element 933 of the second row is offset from the first detector element 931 of the first row, that is shifted in the same direction as the direction of a row (horizontal as shown for the infrared detector 930 of FIG. 9B). The second detector element 934 of the second row is also offset from the second detector element 932 of the first row. The front of the infrared detector 930 is shown.

FIG. 9B includes a top view 940 and a side view 950 of a few of the light paths for a subset of monitored volumes of an embodiment represented by projections of the monitored volumes on a wall. The first tier of monitored volumes includes monitored volume 943, monitored volume 944, monitored volume 953, and monitored volume 954. The second tier of monitored volumes includes monitored volume 941, monitored volume 942, monitored volume 951, and monitored volume 952. Both the first tier of monitored volumes and the second tier of monitored volumes are shown in the top view 940 but other lower tiers are not shown in the top view 940. The side view 950 shows the end monitored volume of four tiers, the first tier's end monitored volume 954, the second tier's end monitored volume 952, the third tier's end monitored volume 958 and the fourth tier's end monitored volume 956. Embodiments can include additional monitored volumes in each tier and/or more tiers.

In the embodiment of FIG. 9B, lenses, such as lenses 935, 937, 938, direct electromagnetic radiation, such as infrared light, from the monitored volumes onto the detector elements of the infrared detector 930. The top of the infrared detector 930 is shown in the top view 940 and the left side of the infrared detector 930 is shown in the side view 950. The front of the infrared detector 930 is facing to the right in both the top view 940 and the side view 950. The first lens 935 is positioned to direct light from a portion of the first and second tiers of monitored volumes onto the infrared detector 930, so that light from the monitored volume 943 is directed onto detector element 933, light from the monitored volume 944 is directed onto detector element 934, light from the monitored volume 941 is directed onto detector element 931, and light from the monitored volume 942 is directed onto detector element 932. Another lens 937 directs light from another portion of the first and second tiers of monitored volumes onto the infrared detector 930, so that light from the monitored volume 951 is directed onto detector element 931, light from the monitored volume 952 is directed onto detector element 932, light from the monitored volume 953 is directed onto detector element 933, and light from the monitored volume 954 is directed onto detector element 934.

Other lenses direct portions of other pairs of tiers of monitored volumes onto the infrared detector 930. In the example shown in the side view 950 of the embodiment of FIG. 9B, lens 938 directs light from the monitored volume 958 and monitored volume 956, as well as other monitored volumes of those tiers (not shown but behind monitored volumes 958, 956 in side view 950) onto the infrared detector 930 so the light from the monitored volume 958 is directed onto detector element 934, light from an adjacent monitored volume of that tier is directed onto detector element 933, light from the monitored volume 956 is directed onto detector element 932, and light from an adjacent monitored volume of that tier is directed onto detector element 931.

A large number of individual lenses can be used in an embodiment, although some embodiments utilize one or more Fresnel lenses to direct the electromagnetic radiation as shown in FIG. 9B. For at least some embodiments utilizing an infrared detector with two rows of two aligned detector elements, an embodiment having four tiers of four monitored volumes includes at least four lenses or different Fresnel elements. For at least some embodiments having 12 tiers of 6 monitored volumes as shown in FIG. 8, at least 18 lenses, or different Fresnel elements, are used. Some embodiments use one lens for each monitored volume.

In the embodiment of FIG. 9B, an offset between rows of detector elements on the infrared detector is used to create an offset between tiers of monitored volumes. So in some embodiments of a motion sensor, an infrared detector includes a first set of detector elements, and a second set of detector elements that have a first offset from the first set in a first detector direction (i.e. a direction on the substrate of the infrared detector) to create two rows of detector elements. The second set of detector elements are positioned to have a second offset from the first set of detector elements in a second detector direction that is orthogonal to the first detector direction (i.e. the sets, or rows, are offset from each other).

FIG. 9C shows an embodiment that uses reflecting elements, reflectors, or mirrors, to generate the offset between tiers of monitored volumes. The infrared detector 960 of FIG. 9C has a first row of two detector elements, detector element 961 and detector element 962, and a second row of two detector elements, detector element 963 and detector element 964, that is offset from the first row of detector elements. The first detector element 961 of the first row is offset from the first detector element 963 of the second row, and the second detector element 962 of the first row is offset from the second detector element 964 of the second row. The front of the infrared detector 960 is shown.

FIG. 9C includes a top view 980 and a side view 990 of a few of the light paths for a subset of monitored volumes of an embodiment represented by projections of the monitored volumes on a wall. The second tier of monitored volumes includes monitored volume 983, monitored volume 984, monitored volume 993, and monitored volume 994. The first tier of monitored volumes includes monitored volume 981, monitored volume 982, monitored volume 991, and monitored volume 992. Both the first tier of monitored volumes and the second tier of monitored volumes are shown in the top view 980 but other lower tiers are not shown in the top view 980. The side view 990 shows the end monitored volume of four tiers, the first tier's end monitored volume 992, the second tier's end monitored volume 994, the third tier's end monitored volume 998 and the fourth tier's end monitored volume 996. Embodiments can include additional monitored volumes in each tier and/or more tiers.

In the embodiment of FIG. 9C, one or more reflecting elements, only some of which are shown, are used to reflect light from the monitored volumes to the infrared detector 960 where an offset between rows of detector elements on the infrared detector 960 is used to generate the offset between tiers of monitored volumes. The top of the infrared detector 960 is shown in the top view 980 and the right side of the infrared detector 960 is shown in the side view 990. The front of the infrared detector 960 is facing to the left and slightly down in both the top view 980 and the side view 990. The first reflecting element 973 is positioned to reflect light from a portion of the first and second tiers of monitored volumes on the infrared detector 960, so that light from the monitored volume 981 is reflected to detector element 961, light from the monitored volume 982 is reflected to detector element 962, light from the monitored volume 983 is reflected to detector element 963, and light from the monitored volume 984 is reflected to detector element 964. Another reflecting element 974 reflects another portion of the first and second tiers of monitored volumes on the infrared detector 960, so that light from the monitored volume 991 is reflected to detector element 961, light from the monitored volume 992 is reflected to detector element 962, light from the monitored volume 993 is reflected to detector element 963, and light from the monitored volume 994 is reflected to detector element 964.

Additional reflecting elements reflect portions of other tiers of monitored volumes on the infrared detector 960. In the example shown in the side view 990 of the embodiment of FIG. 9C, reflecting element 976 reflects light from the monitored volume 998, as well as another adjacent monitored volume of that tier (not shown but behind monitored volume 998 in side view 990) on the first row of detector elements so the light from the monitored volume 998 is reflected to detector element 962 and the adjacent monitored volume of that tier is directed onto detector element 961. The reflecting element 976 also reflects light from the monitored volume 996, as well as another adjacent monitored volume of that tier (not shown but behind monitored volume 996 in side view 990) on the second row of detector elements so the light from the monitored volume 996 is reflected to detector element 964 and the other adjacent monitored volume of that tier is directed onto detector element 963.

A large number of individual reflecting elements can be used in an embodiment, which may also include one or more lenses or Fresnel lenses. For at least some embodiments utilizing an infrared detector with two rows of two offset detector elements, an embodiment having four tiers of four monitored volumes includes at least four reflecting elements. For at least some embodiments having 12 tiers of 6 monitored volumes as shown in FIG. 8, at least 18 reflecting elements, are used. Some embodiments use an individual reflecting element for each monitored volume.

In the embodiment of FIG. 9C, reflecting elements are used to direct light from offset monitored volumes onto the infrared detector 960 having offset between rows of detector elements. In other embodiments, reflecting elements are used create an offset between tiers of monitored volumes even though there is no offset between rows, or sets, of detector elements on the infrared detector.

The optical system of a motion sensor can use any combination of conventional lenses, Fresnel lenses, compound lenses, diffractive lenses, reflecting elements, focusing mirrors, diffractive mirrors, planar reflectors, slits, light guides, filters, optical coatings, arrays of any of the aforementioned optical elements, or any other type of optical component, to direct electromagnetic radiation from monitored volumes onto detector elements of an infrared detector, depending on the embodiment. An offset between tiers, rows, or sets, of monitored volumes can be created using an offset between rows, or sets, of detector elements on an infrared detector, by using the optical system of the motion sensor, or by a combination of the geometry of the infrared detector and the characteristics of the optical system, depending on the embodiment.

Figure 10:
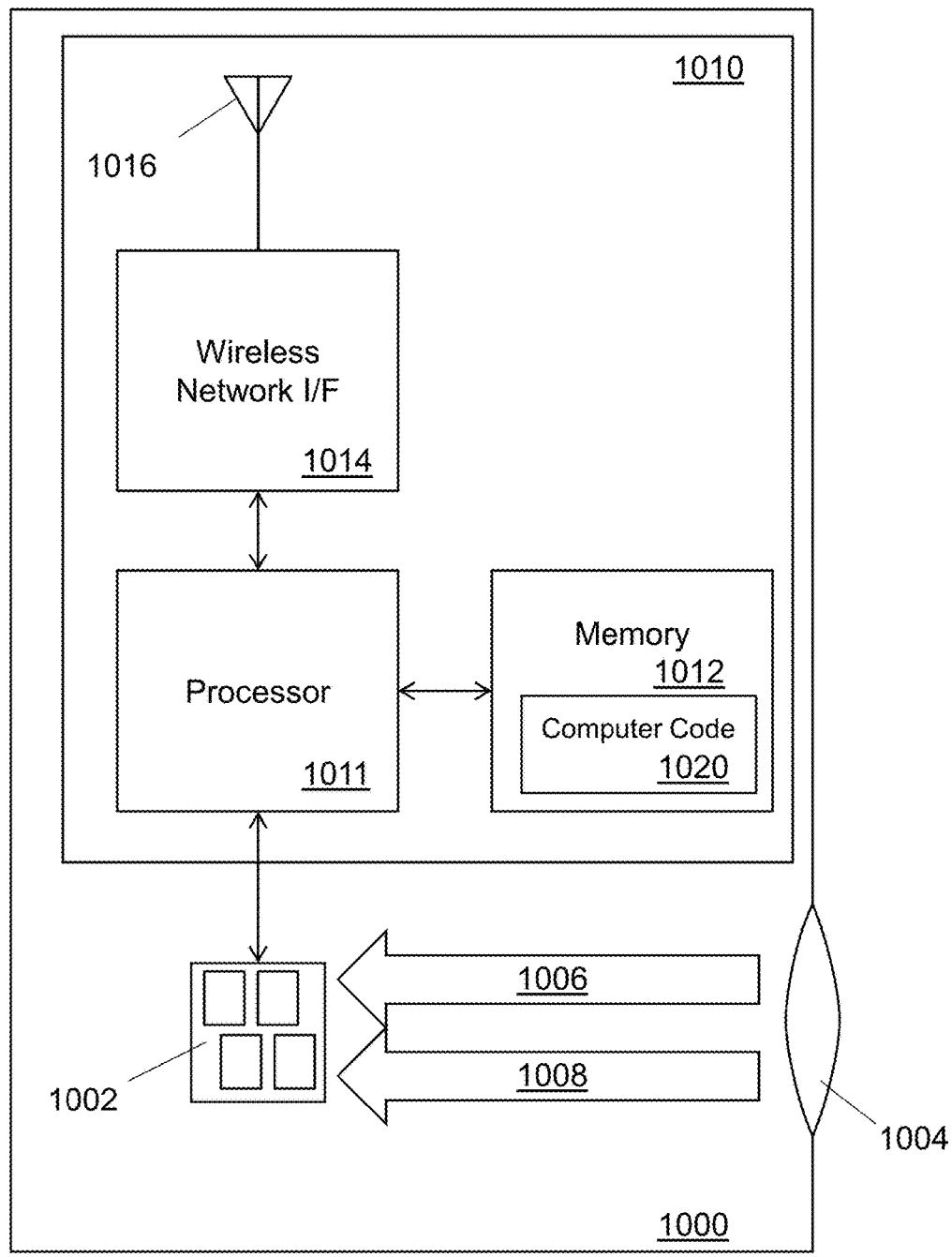
FIG. 10 shows a block diagram of an embodiment of a motion sensor.

FIG. 10 shows a block diagram of an embodiment of a motion sensor 1000. The motion sensor 1000 includes an infrared detector 1002 that has a first set of detector elements and a second set of detector elements. The motion sensor 1000 also includes an optical system 1004 to direct electromagnetic energy 1006 from a first set of monitored volumes onto the first set of detector elements and to direct electromagnetic energy 1008 from a second set of monitored volumes onto the second set of detector elements. In embodiments, the electromagnetic energy directed onto the detector elements includes infrared light. The first set of monitored volumes are spaced at a pitch and the second set of monitored volumes are spaced at the same pitch. The second set of monitored volumes have an offset from the first set of monitored volumes in a direction parallel to the pitch, as shown in FIG. 8. In some embodiments the optical system 1004 creates the offset between the two sets of monitored volumes, and in some embodiments the offset between the two sets of monitored volumes is created by an offset between the two sets of detector elements on the infrared detector 1002. The offset can be any percentage of the pitch, depending on the embodiment, but in some embodiments, the offset is a non-quadrature offset, e.g. the offset is not equal to 50% of the pitch. In some embodiments, the second set of monitored volumes have a second offset from the first set of monitored volumes in a second direction that is orthogonal to the first direction. The second offset can create two or more tiers of monitored volumes which may or may not be overlapping, depending on the embodiment.

The motion sensor 1000 of the embodiment of FIG. 10 also includes circuitry 1010 such as a processor 1011 coupled to the infrared detector 1002. Memory 1012 which can store computer code 1020, is coupled to the processor 1011 in embodiments, and the processor 1011 can read the computer code 1020 from the memory 1012 and execute the computer code 1020 to perform one or more of the methods described herein in some embodiments. A wireless network interface 1014 is coupled to an antenna 1016 as well as to the processor 1011 to allow radio frequency messages to be sent and/or received by the motion sensor 1000 over a wireless computer network such as, but not limited to, a Wi-Fi network or a Zigbee network. Other embodiments include different types of circuitry 1010 that may or may not include a processor 1011, but may include specialized hard-wired or specialized circuitry to perform one or more methods described herein.

In embodiments, the circuitry 1010 receives first thermal information about the first set of detector elements of the motion sensor 1002 and second thermal information about the second set of detector elements of the motion sensor 1002. In embodiments the first thermal information includes thermal information from a first set of monitored volumes, and the second thermal information that includes thermal information from a second set of monitored volumes. In at least one embodiment, the first set of monitored volumes includes a plurality of aligned rows of monitored volumes and the second set of monitored volumes includes a plurality of aligned rows of monitored volumes that are offset from the rows of the first set and alternate with the rows of the first set.

The circuitry 1010 in some embodiments registers a first background level for the first thermal information, and a second background level for the second thermal information. The circuitry 1010 then compares a first waveform representing the first thermal information after subtracting the first background level to a second waveform representing the second thermal information after subtracting the second background level. In some embodiments, the background levels are not registered or compensated for, as the steady-state condition of the environment can be assumed to be constant and/or any charge generated by the pyroelectric effect has been discharged through leakage current in the infrared detector. A first type of motion indication, which may be referred to as an animal-immune motion indication, a major motion indication, or a human motion indication, is generated by the circuitry 1010 if the second waveform corresponds to the first waveform with a phase shift corresponding to the offset. In some embodiments, the first type of motion indication includes a radio frequency message sent through the antenna 1016, a visual indication, and/or an audible indication. In some embodiments the circuitry 1010 also determines whether a smoothed difference between the first waveform and the second waveform exceeds a predetermined value, and generates a second type of motion indication if the smoothed difference exceeds the predetermined value. In some embodiments, the second type of motion indication, which may be referred to as a minor motion indication, a sedentary-human motion indication, a small-animal motion indication, or a non-animal-immune motion indication, includes a radio frequency message sent through the antenna 1016, a visual indication, and/or an audible indication.

In some embodiments, a mode setting is obtained by the circuitry 1010. The mode setting is set by a physical switch on the motion sensor 1000 in some embodiments, but in other embodiments, the mode setting is received as a message over a wireless network through the antenna 1016. The mode setting in embodiments can be set to one of several different states, including a first state to detect major motion but not minor motion, a second state to detect either major or minor motion and not indicate a difference (e.g. a general motion detection), a third state to detect minor motion but not major motion, a fourth state to detect either major or minor motion and to report the difference, and a fifth state to disable detection of any motion, minor or major. Various embodiments can implement any subset of the five states described, as well as other states. In embodiments implementing minor motion detection, if the smoothed difference between the two waveforms exceeds the predetermined value and the mode is set for minor motion detection, a motion indication is generated. If the mode setting has a state that the type of motion is to be reported, the motion indication generated shows that type of motion detected, such as minor or major. If the mode is set to ignore animals (i.e. for major motion detection only), no motion indication is generated in response to the smoothed difference between the two waveforms exceeding the predetermined value. In at least one embodiment, the mode setting is included in a first message received through the antenna, the first type of motion indication, or major motion indication, includes a second message sent through the antenna, and the second type of motion indication, or minor motion indication, includes a third message sent through the antenna. Each of the three messages includes different content in at least some embodiments.

Figure 11:
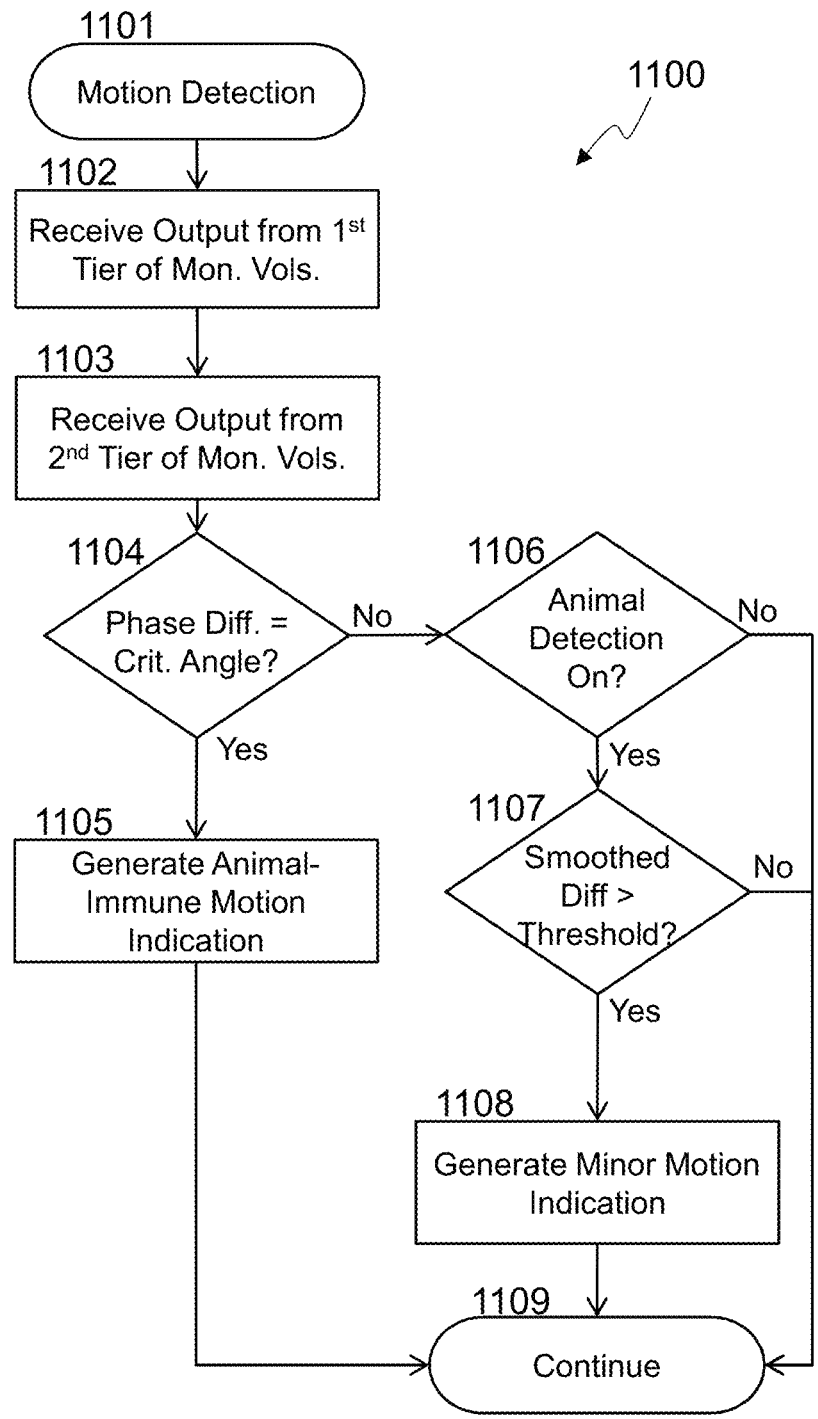
FIG. 11 shows a flow chart of an embodiment of a method to detect motion.

FIG. 11 shows a flow chart 1100 of an embodiment of a method to detect motion. The motion detection starts at block 1101 and continues by receiving a first output of an infrared detector representing a warm body passing through a first tier of monitored volumes at block 1102. A second output of the infrared detector representing the warm body passing through a second tier of monitored volumes is received at block 1103. In embodiments, the second tier of monitored volumes is located above the first tier of monitored volumes with a horizontal offset from the first tier of monitored volumes. A phase difference between the first output and the second output of the infrared detector is checked at block 1104. If the phase angle corresponds to a critical phase angle that is greater than 0°, an animal-immune (major motion) indication is generated at block 1105 and the motion sensor continues to monitor for motion at block 1109. The critical phase angle of an embodiment is based on a pitch of monitored volumes and the horizontal offset of the between the tiers of monitored volumes. In some embodiments, the critical phase angle is between about 10 degrees and about 170 degrees. In some embodiments, the critical phase angle is between about 10 degrees and about 80 degrees or between about 100 degrees and about 170 degrees. In some embodiments, the animal-immune motion indication includes a visual indication or an audible indication. In some embodiments, the animal-immune motion indication includes a radio frequency message.

If, at block 1104, the phase angle does not correspond to the critical phase angle, or if there is no phase relationship between the two outputs, some embodiments check a mode setting to see if animal detection has been enabled at block 1106. If animal detection has not been enabled, any minor motion indication is suppressed, and the motion sensor continues to monitor motion at block 1109. If animal detection has been enabled, it is determined whether a smoothed difference between the first output and the second output exceeds a predetermined value after compensating, in some embodiments, for background levels of the first output and second output at block 1107. If the smoothed difference exceeds the predetermined value, a minor motion indication is generated at block 1108. In some embodiments, the major motion indication and the minor motion indication are different and provide information about the type of motion detected. In other embodiments, the major motion indication and the minor motion indication are indistinguishable.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuitry," "block," "motion sensor," or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the processor of an embodiment, partly on the processor of an embodiment and partly on another processor that may be local or remote to the motion sensor, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Some embodiments may be a stand-alone software package.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Examples of various embodiments are described in the following paragraphs:

An example infrared detector includes a substrate comprising a pyroelectric material, a first set of detector elements positioned on the substrate spaced a pitch distance apart, and a second set of detector elements positioned on the substrate spaced about the pitch distance apart, wherein the second set of detector elements are positioned with a non-quadrature offset from the first set of detector elements. In some example infrared detectors the first set of detector elements comprises at least two serially coupled detector elements, and the second set of detector elements comprises at least two serially coupled detector elements. In some example infrared detectors the first set of detector elements comprises a first row of detector elements, and the second set of detector elements comprises a second row of detector elements that is substantially non-overlapping with the first row. In some example infrared detectors the non-quadrature offset is between 5% of the pitch distance and 45% of the pitch distance or between 55% of the pitch distance and 95% of the pitch distance. In some example infrared detectors the non-quadrature offset is about one third or about two thirds of the pitch distance. Some example infrared detectors also include a first output coupled to the first set of detector elements, and a second output coupled to the second set of detector elements. Some example infrared detectors also include a ground terminal, wherein the first set of detector elements consists of a first detector element and a second detector element, the second set of detector elements consists of a third detector element and a fourth detector element, said first, second, third and fourth detector elements each comprise a capacitor using the substrate as a dielectric, the first output is connected to a first terminal of the first detector element, a second terminal of the first detector element is connected to a first terminal of the second detector element, a second terminal of the second detector element is connected to the ground terminal, the second output is connected to a first terminal of the third detector element, a second terminal of the third detector element is connected to a first terminal of the fourth detector element, and a second terminal of the fourth detector element is connected to the ground terminal. Some example infrared detectors also include a package, wherein the substrate is mounted in the package and positioned to allow external electromagnetic energy to affect the substrate, at least one terminal accessible from outside of the package, and circuitry, mounted in the package and coupled to the at least one terminal, the first set of detector elements, and the second set of detector elements, to detect a first pyroelectric effect on the first set of detector elements and a second pyroelectric effect on the second set of detector elements, and to provide information about the first pyroelectric effect and the second pyroelectric effect at the at least one terminal. In some example infrared detectors the circuitry comprises at least one analog-to-digital converter, and the information about the first pyroelectric effect and the second pyroelectric effect at the at least one terminal comprises digital data representing at least one voltage waveform. In some example infrared detectors the circuitry comprises a first transistor buffer coupled to the first set of detector elements and a second transistor buffer coupled to the second set of detector elements, and the at least one terminal comprises a first output terminal, a second output terminal, a power terminal, and a ground terminal, and the information about the first pyroelectric effect comprises a first analog voltage waveform at the first output terminal, and the information about the second pyroelectric effect comprises a second analog voltage waveform at the second output terminal. Any combination of elements described in this paragraph may be used in various embodiments.

An example motion sensor includes an infrared detector comprising a first set of detector elements and a second set of detector elements, and an optical system to direct electromagnetic energy from a first set of monitored volumes spaced at a pitch in a first direction onto the first set of detector elements and to direct electromagnetic energy from a second set of monitored volumes spaced at the pitch in the first direction onto the second set of detector elements, wherein the second set of monitored volumes have an offset from the first set of monitored volumes in the first direction. In some example motion sensors, the electromagnetic energy comprises infrared light. In some example motion sensors, the optical system comprises at least a Fresnel lens. In some example motion sensors, the optical system comprises at a plurality of reflecting elements. In some example motion sensors, the offset is a non-quadrature offset. In some example motion sensors, the second set of monitored volumes have a second offset from the first set of monitored volumes in a second direction that is orthogonal to the first direction. In some example motion sensors, the first set of monitored volumes comprises two or more tiers of monitored volumes, and the second set of monitored volumes comprises two or more tiers of monitored volumes interleaved with the two or more tiers of monitored volumes of the first set of monitored volumes. In some example motion sensors, the second set of detector elements are positioned with a first offset from the first set of detector elements in a first detector direction on a pyroelectric substrate, and the second set of detector elements are positioned at a second offset from the first set of detector elements in a second detector direction on the pyroelectric substrate that is orthogonal to the first detector direction. In some example motion sensors, the second set of detector elements are positioned without a significant offset from the first set of detector elements in a first detector direction on a pyroelectric substrate, and the second set of detector elements are positioned at an offset from the first set of detector elements in a second detector direction on the pyroelectric substrate that is orthogonal to the first detector direction, and the optical system comprises a first set of optical elements to direct the electromagnetic energy from the first set of monitored volumes onto the first set of detector elements on a first path having a first geometry, and a second set of optical elements to direct the electromagnetic energy from the second set of monitored volumes onto the second set of detector elements on a second path having a second geometry that is different than the first geometry. Some example motion sensors also include circuitry to receive first thermal information about the first set of detector elements, and second thermal information about the second set of detector elements, compare a first waveform representing the first thermal information to a second waveform representing the second thermal information, and generate a first type of motion indication if the second waveform corresponds to the first waveform with a phase shift corresponding to the offset. Some example motion sensors also include circuitry to register a first background level for the first thermal information, and a second background level for the second thermal information, subtract the first background level from the first thermal information to create the first waveform, and the second background level from the second thermal information to create the second waveform. Some example motion sensors also include an antenna coupled to the circuitry, wherein the first type of motion indication comprises a radio frequency message sent through the antenna. In some example motion sensors the second set of monitored volumes have a second offset from the first set of monitored volumes in a second direction that is orthogonal to the first direction, and the motion sensor further comprises circuitry to determine whether a smoothed difference between the first waveform and the second waveform exceeds a predetermined value, and generate a second type of motion indication if the smoothed difference exceeds the predetermined value. Some example motion sensors also include circuitry to receive a mode setting for animal detection, determine whether a smoothed difference between the first waveform and the second waveform exceeds a predetermined value, generate a second type of motion indication if the smoothed difference exceeds the predetermined value and the mode is set for animal detection, and suppress the second type of motion indication if the mode is not set for animal detection. Some example motion sensors also include an antenna coupled to the circuitry, wherein the mode setting is included in a first message received through the antenna, the first type of motion indication comprises a second message sent through the antenna, and the second type of motion indication comprises a third message sent through the antenna. Any combination of elements described in this paragraph may be used in various embodiments.

Another example motion sensor includes an infrared detector to provide first thermal information from a first row of monitored volumes having a pitch and second thermal information from a second row of monitored volumes having the pitch and shifted in a direction parallel to the first row by an offset, and circuitry, coupled to the infrared detector, to detect a phase relationship of waveforms extracted from the first thermal information and the second thermal information, and to generate an animal-immune motion indication if the phase relationship corresponds to a critical phase angle, wherein the critical phase angle is greater than 0 degrees, and is based on the offset and the pitch. In some example motion sensors the critical phase angle is between 10 degrees and 80 degrees or between 100 degrees and 170 degrees. In some example motion sensors the critical phase angle is 180 degrees times a percentage of the pitch represented by the offset. In some example motion sensors the first row of monitored volumes and the second row of monitored volumes are substantially non-overlapping. Some example motion sensors also include circuitry, coupled to the infrared detector, to detect a smoothed difference between the waveforms extracted from the first thermal information and the second thermal information, and to generate a minor motion indication if the smoothed difference exceeds a predetermined value. In some example motion sensors the first thermal information includes thermal information from a first plurality of aligned rows of monitored volumes that includes the first row of monitored volumes, and the second thermal information includes thermal information from a second plurality of aligned rows of monitored volumes that includes the second row of monitored volumes, wherein the first plurality of aligned rows of monitored volumes alternate with the second plurality of aligned rows of monitored volumes. In some example motion sensors the animal-immune motion indication comprises a visual indication or an audible indication. In some example motion sensors the animal-immune motion indication comprises a radio frequency message. Any combination of elements described in this paragraph may be used in various embodiments.

An example method of detecting motion includes receiving a first output of an infrared detector representing a warm body passing through a first tier of monitored volumes, receiving a second output of the infrared detector representing the warm body passing through a second tier of monitored volumes, wherein the second tier of monitored volumes are located above the first tier of monitored volumes with a horizontal offset from the first tier of monitored volumes, and generating an animal-immune motion indication based on a phase difference between the first output and the second output of the infrared detector corresponding to a critical phase angle, wherein the critical phase angle is greater than 0 degrees. In some example methods the critical phase angle is between 10 degrees and 170 degrees. In some example methods the critical phase angle is between 10 degrees and 80 degrees or between 100 degrees and 170 degrees. In some example methods the animal-immune motion indication comprises a visual indication or an audible indication. In some example methods the animal-immune motion indication comprises a radio frequency message. Some example methods also include determining whether a smoothed difference between the first output and the second output exceeds a predetermined value, and generating a minor motion indication in response to the determining that the smoothed difference exceeds the predetermined value. Some example methods also include compensating for background levels of the first output and second output in calculation of the smoothed difference. Some example methods also include obtaining a setting for a mode for animal detection, and determining whether a smoothed difference between the first output and the second output exceeds a predetermined value, and in response to the smoothed difference exceeding the predetermined value, generating a minor motion indication if the mode is set for animal detection, and suppressing the minor motion indication if the mode is not set for animal detection. In some example methods the minor motion indication and the animal-immune motion indication are indistinguishable. In some example methods the obtaining the setting for the mode for animal detection comprises receiving the setting though a wireless network, the animal-immune motion indication comprises a first message sent through the wireless network, and the minor motion indication comprises a second message sent through the wireless network. Any combination of elements described in this paragraph may be used in various embodiments. Any example method may be implemented, at least in party, using at least one machine readable medium comprising one or more instructions that in response to being executed on a computing device cause the computing device to carry out a method according to this paragraph.

An example computer program product for detecting motion includes at least one non-transitory computer readable storage medium having computer readable program code embodied therewith, the computer readable program code comprising computer readable program code to receive a first output of an infrared detector representing a warm body passing through a first tier of monitored volumes, computer readable program code to receive a second output of the infrared detector representing the warm body passing through a second tier of monitored volumes, wherein the second tier of monitored volumes are located below the first tier of monitored volumes with a horizontal offset from the first tier of monitored volumes, and computer readable program code to generate an animal-immune motion indication based on a phase difference between the first output and the second output of the infrared detector corresponding to a critical phase angle that is greater than 0 degrees. In some example computer program products the critical phase angle is between 10 degrees and 170 degrees. In some example computer program products the critical phase angle is between 10 degrees and 80 degrees or between 100 degrees and 170 degrees. Some example computer program products also include computer readable code to generate a visual indication or an audible indication as at least a part of the animal-immune motion indication. Some example computer program products also include computer readable code to send a radio frequency message as at least a part of the animal-immune motion indication. Some example computer program products also include computer readable code to determine whether a smoothed difference between the first output and the second output exceeds a predetermined value after compensating for background levels of the first output and second output, and computer readable code to generate a minor motion indication, in response to the smoothed difference exceeding the predetermined value. Some example computer program products also include computer readable code to obtain a setting for a mode for animal detection, computer readable code to determine whether a smoothed difference between the first output and the second output exceeds a predetermined value after compensating for background levels of the first output and second output, and computer readable code to, in response to the smoothed difference exceeding the predetermined value, generate a minor motion indication if the mode is set for animal detection, and suppress the minor motion indication if the mode is not set for animal detection. Some example computer program products also include computer readable code to receive the setting for the mode though a wireless network, computer readable code to send the animal-immune motion indication as a first message through the wireless network, and computer readable code to send the minor motion indication as a second message through the wireless network. Any combination of elements described in this paragraph may be used in various embodiments.

Another example method of detecting human motion within an infrared detection area includes sensing infrared intensity within the infrared detection area as received from at least two stacked non-overlapping detection tiers, each having a plurality of non-overlapping monitored volumes, the plurality of non-overlapping monitored volumes of the at least two detection tiers shifted from each other in a horizontal direction by an offset, generating a major motion indication indicative of a presence of a human in response to registering sufficient changes in the infrared intensity on vertically adjacent detection tiers of the at least two stacked detection tiers if the changes have a phase relationship that corresponds to a critical phase angle, and ignoring changes in the infrared intensity on vertically adjacent detection tiers of the at least two stacked detection tiers if the changes have a phase relationship that does not correspond to the critical phase angle, wherein the critical phase angle is greater than 0 degrees. Some example methods also include ignoring a change in the infrared intensity that occurs in only one detection tier of the at least two stacked non-overlapping detection tiers. Some example methods also include generating a minor motion indication indicative of a presence of an animal in response to a change in the infrared intensity that occurs in only one detection tier of the at least two stacked non-overlapping detection tiers. Some example methods also include obtaining a setting for a mode for animal detection, and generating a minor motion indication indicative of a presence of an animal in response to a change in the infrared intensity that occurs in only one detection tier of the at least two stacked non-overlapping detection tiers if the mode is set for animal detection, and suppressing the minor motion indication if the mode is not set for animal detection. In some example methods the critical phase angle is between 10 degrees and 80 degrees or between 100 degrees and 170 degrees. In some example methods the critical phase angle is 180 degrees times a percentage of a pitch of the non-overlapping monitored volumes represented by the offset. Any combination of elements described in this paragraph may be used in various embodiments. Any example method may be implemented, at least in party, using at least one machine readable medium comprising one or more instructions that in response to being executed on a computing device cause the computing device to carry out a method according to this paragraph.

Another infrared detector includes a substrate comprising a pyroelectric material, a first row of detector elements positioned on the substrate and spaced a pitch distance apart, and a second row of detector elements positioned on the substrate and spaced about the pitch distance apart, wherein the first row and the second row are substantially non-overlapping, and the second row of detector elements are positioned at a non-zero offset from the first row of detector elements in a direction parallel to the first row. In some example infrared detectors the first row of detector elements comprises at least two serially coupled detector elements, and the second row of detector elements comprises at least two serially coupled detector elements. In some example infrared detectors the non-zero offset is between 5% of the pitch distance and 95% of the pitch distance. In some example infrared detectors the non-zero offset is about half of the pitch distance. In some example infrared detectors the non-zero offset is a non-quadrature offset. Some example infrared detectors also include a first output coupled to the first row of detector elements, and a second output coupled to the second row of detector elements. Some example infrared detectors also include a package, wherein the substrate is mounted on the package and positioned to allow external electromagnetic energy to affect the substrate, at least one terminal accessible from outside of the package, and circuitry, mounted in the package and coupled to the at least one terminal, the first row of detector elements, and the second row of detector elements, to detect a first pyroelectric effect on the first row of detector elements and a second pyroelectric effect on the second row of detector elements, and to provide information about the first pyroelectric effect and the second pyroelectric effect at the at least one terminal. In some example infrared detectors the circuitry comprises at least one analog-to-digital converter, and the information about the first pyroelectric effect and the second pyroelectric effect at the at least one terminal comprises digital data representing at least one voltage waveform. In some example infrared detectors the circuitry comprises a first transistor buffer coupled to the first row of detector elements and a second transistor buffer coupled to the second row of detector elements, wherein the at least one terminal comprises a first output terminal, a second output terminal, a power terminal, and a ground terminal, and the information about the first pyroelectric effect comprises a first analog voltage waveform at the first output terminal, and the information about the second pyroelectric effect comprises a second analog voltage waveform at the second output terminal. Any combination of elements described in this paragraph may be used in various embodiments.

As used in this specification and the appended claims, the singular forms "a", "an", and "the" include plural referents unless the content clearly dictates otherwise. Thus, for example, reference to an element described as "a monitored volume" may refer to a single monitored volume, two monitored volumes, or any other number of monitored volumes. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±5% of the modified quantity, measurement, or distance. The recitation of numerical ranges by endpoints includes all numbers subsumed within that range (e.g. 1 to 5 includes 1, 2.78, 3.$\overline{33}$, and 5). Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A motion sensor comprising:
    an infrared detector comprising a first set of at least two detector elements serially-coupled between a first terminal of the infrared detector and a circuit ground, and a second set of at least two detector elements serially-coupled between a second terminal of the infrared detector and the circuit ground; and
    an optical system arranged to direct infrared light from a first row of at least two monitored volumes, spaced at a pitch in a first direction, onto the first set of detector elements and to direct infrared light from a second row of the at least two monitored volumes, spaced at the pitch in a direction parallel to the first direction, onto the second set of detector elements;
    wherein the second row of monitored volumes has a first offset, which is non-zero and less than the pitch, from the first row of monitored volumes in the direction parallel to the first direction, and a second offset from the first row of monitored volumes in a second direction that is orthogonal to the first direction.

2. The motion sensor of claim 1, wherein the optical system comprises a Fresnel lens.

3. The motion sensor of claim 1, wherein the optical system comprises a plurality of reflecting elements.

4. The motion sensor of claim 1, wherein the first offset is a non-quadrature offset.

5. The motion sensor of claim 1, wherein the first row of monitored volumes and the second row of monitored volumes are substantially non-overlapping.

6. The motion sensor of claim 1, wherein a first set of monitored volumes comprises two or more rows of monitored volumes, including the first row of monitored volumes; and
    a second set of monitored volumes, separate from the first set of monitored volumes, comprises two or more rows of monitored volumes, including the second row of monitored volumes, the two or more rows of monitored volumes of the second set of monitored volumes interleaved with the two or more rows of monitored volumes of the first set of monitored volumes;
    the optical system further arranged to direct infrared light from the first set of monitored volumes onto the first set of detector elements and to direct infrared light from the second set of monitored volumes onto the second set of detector elements.

7. The motion sensor of claim 6, the optical system further arranged to:
   direct infrared light from odd monitored volumes of the first set of monitored volumes to a first detector of the first set of detector elements;
   direct infrared light from odd monitored volumes of the second set of monitored volumes to a first detector of the second set of detector elements;
   direct infrared light from even monitored volumes of the first set of monitored volumes to a second detector of the first set of detector elements; and
   direct infrared light from even monitored volumes of the second set of monitored volumes to a second detector of the second set of detector elements;
   wherein each row of monitored volumes consists of alternating odd and even monitored volumes.

8. The motion sensor of claim 1, the optical system further arranged to:
   direct infrared light from a first plurality of monitored volumes of the first row of monitored volumes to a first detector element of the first set of detector elements; and
   direct infrared light from a second plurality of monitored volumes of the first row of monitored volumes to a second detector element of the first set of detector elements;
   wherein the first plurality of monitored volumes and the second plurality of monitored volumes are interleaved in the first row of monitored volume.

9. The motion sensor of claim 1, wherein
   the first set detector elements are positioned as a first row of detector elements on a pyroelectric substrate;
   the second set of detector elements are positioned as a second row of detector elements on the pyroelectric substrate;
   the second row of detector elements is positioned with a first offset from the first row of detector elements in a first detector direction on the pyroelectric substrate; and
   the second row of detector elements is positioned at a second offset from the first row of detector elements in a second detector direction on the pyroelectric substrate that is orthogonal to the first detector direction.

10. The motion sensor of claim 1, wherein the second set of detector elements are positioned without a significant offset from the first set of detector elements in a first detector direction on a pyroelectric substrate, and the second set of detector elements are positioned at an offset from the first set of detector elements in a second detector direction on the pyroelectric substrate that is orthogonal to the first detector direction; and
   wherein the optical system comprises:
     a first set of optical elements arranged to direct the infrared light from the first row of the at least two monitored volumes onto the first set of detector elements through a first path having a first geometry; and
     a second set of optical elements arranged to direct the infrared light from the second row of the at least two monitored volumes onto the second set of detector elements through a second path having a second geometry that is different than the first geometry.

11. The motion sensor of claim 1, further comprising circuitry to:
   receive first thermal information about the first set of detector elements from the first terminal of the infrared detector, and second thermal information about the second set of detector elements from the second terminal of the infrared detector;
   compare a first waveform representing the first thermal information to a second waveform representing the second thermal information; and
   generate a first type of motion indication in response to a determination that the second waveform corresponds to the first waveform with a phase shift corresponding to the first offset.

12. The motion sensor of claim 11, further comprising circuitry to:
   register a first background level for the first thermal information, and a second background level for the second thermal information;
   subtract the first background level from the first thermal information to create the first waveform, and the second background level from the second thermal information to create the second waveform.

13. The motion sensor of claim 11, further comprising an antenna coupled to the circuitry;
   wherein the first type of motion indication comprises a radio frequency message sent through the antenna.

14. The motion sensor of claim 11, wherein the motion sensor further comprises circuitry to:
   determine that a smoothed difference between the first waveform and the second waveform exceeds a predetermined value; and
   generate a second type of motion indication in response to said determination that the smoothed difference exceeds the predetermined value.

15. The motion sensor of claim 11, further comprising circuitry to:
   receive a mode setting for animal detection;
   determine whether a smoothed difference between the first waveform and the second waveform exceeds a predetermined value;
   generate a second type of motion indication in response to a determination that the smoothed difference exceeds the predetermined value and the mode is set for animal detection; and
   suppress the second type of motion indication in response to a determination that the mode is not set for animal detection.

16. The motion sensor of claim 15, further comprising an antenna coupled to the circuitry;
   wherein the mode setting is included in a first message received through the antenna;
   the first type of motion indication comprises a second message sent through the antenna; and
   the second type of motion indication comprises a third message sent through the antenna.

17. A motion sensor comprising:
   an infrared detector comprising a first set of detector elements coupled to a first output of the infrared detector and a second set of detector elements, separate from the first set of detector elements, coupled to a second output of the infrared detector; and
   an optical system arranged to direct infrared light from a first row of monitored volumes spaced at a pitch in a first direction onto the first set of detector elements and to direct infrared light from a second row of monitored volumes spaced at the pitch in the first direction onto the second set of detector elements;

wherein the second row of monitored volumes has a non-zero offset, less than the pitch, from the first row of monitored volumes in the first direction; and the first row of monitored volumes and second row of monitored volumes are substantially non-overlapping.

18. The motion sensor of claim 17, the optical system further arranged to:

direct infrared light from a third row of monitored volumes onto the first set of detector elements and to direct infrared light from a fourth row of monitored volumes onto the second set of detector elements;

wherein the second row of monitored volumes is located between the first row monitored volumes and the third row of monitored volumes, and the third row of monitored volumes is located between the second row monitored volumes and the fourth row of monitored volumes; and the first row of monitored volumes, the second row of monitored volumes, the third row of monitored volumes, and the fourth row of monitored volumes are all substantially non-overlapping with respect to each other.

19. The motion sensor of claim 18, the optical system further arranged to:

direct infrared light from a first plurality of monitored volumes of the first row of monitored volumes and a first plurality of monitored volumes of the third row of monitored volumes onto a first detector of the first set of detector elements;

direct infrared light from a first plurality of monitored volumes of the second row of monitored volumes and a first plurality of monitored volumes of the fourth row of monitored volumes onto a first detector of the second set of detector elements;

direct infrared light from a second plurality of monitored volumes of the first row of monitored volumes and a second plurality of monitored volumes of the third row of monitored volumes onto a second detector of the first set of detector elements; and direct infrared light from a second plurality of monitored volumes of the second row of monitored volumes and a second plurality of monitored volumes of the fourth row of monitored volumes onto a second detector of the second set of detector elements.

20. The motion sensor of claim 17, further comprising circuitry to:

receive first thermal information about the first set of detector elements from the first output of the infrared detector, and second thermal information about the second set of detector elements from the second output of the infrared detector;

compare a first waveform representing the first thermal information to a second waveform representing the second thermal information;

generate a motion indication in response to determining that the first waveform and the second waveform have substantially equal frequencies with different phases.

* * * * *